(12) United States Patent
Coleman

(10) Patent No.: US 11,961,037 B2
(45) Date of Patent: Apr. 16, 2024

(54) SHIPPING ITEMS USING AN ELECTRONIC SHIPPING LABEL DEVICE

(71) Applicant: Global Sticks Express, LLC, West Palm Beach, FL (US)

(72) Inventor: Nicholas Coleman, West Palm Beach, FL (US)

(73) Assignee: GLOBAL STICKS EXPRESS, LLC, West Palm Beach, FL (US)

( * ) Notice: Subject to any disclaimer, the term of this patent is extended or adjusted under 35 U.S.C. 154(b) by 1023 days.

(21) Appl. No.: 16/862,460

(22) Filed: Apr. 29, 2020

(65) Prior Publication Data

US 2020/0349505 A1 Nov. 5, 2020

Related U.S. Application Data

(60) Provisional application No. 62/841,062, filed on Apr. 30, 2019.

(51) Int. Cl.
| G06Q 10/00 | (2023.01) |
| G06K 19/06 | (2006.01) |
| G06Q 10/0835 | (2023.01) |

(52) U.S. Cl.
CPC ... *G06Q 10/0835* (2013.01); *G06K 19/06028* (2013.01)

(58) Field of Classification Search
CPC .............................................. G06K 19/06028
See application file for complete search history.

(56) References Cited

U.S. PATENT DOCUMENTS

| 7,207,481 B2 * | 4/2007 | Barenburg | G06K 7/1434 |
| | | | 235/382 |
| 7,511,617 B2 | 3/2009 | Burman et al. | |
| 7,574,366 B2 | 8/2009 | Burman et al. | |
| 7,580,845 B2 | 8/2009 | Burman et al. | |
| 7,774,481 B2 * | 8/2010 | Gulati | H04L 65/1076 |
| | | | 709/228 |
| 8,521,656 B2 * | 8/2013 | Zimberoff | G06Q 30/0641 |
| | | | 705/330 |
| 8,688,598 B1 * | 4/2014 | Shakes | G06Q 10/0832 |
| | | | 705/332 |
| 9,224,084 B2 | 12/2015 | Warther | |
| 9,626,639 B2 * | 4/2017 | Gibbon | G06Q 10/083 |

(Continued)

FOREIGN PATENT DOCUMENTS

WO    WO-2014059329 A2 *    4/2014    ......... G06Q 10/0833

*Primary Examiner* — Laurie A Ries
(74) *Attorney, Agent, or Firm* — FisherBroyles, LLP; Craig W. Mueller

(57) ABSTRACT

The electronic shipping label device may display a shipping label image or shipment information using an electronic paper display, and may be attached to an item for shipment of the item from an origin to a destination. A host device, such as an electronic device of a user, may configure the electronic shipping label device to display the shipping label image. The host device may be configured to communicate with a system server of a shipping management system to provide shipping parameters corresponding to the shipment and receive the shipping label image (e.g., from a third-party system, such as a system associated with a shipping carrier). The host device may transmit the shipping label image to the electronic shipping label device for display.

20 Claims, 11 Drawing Sheets

(56) References Cited

U.S. PATENT DOCUMENTS

| | | |
|---|---|---|
| 9,918,537 B2 | 3/2018 | Warther |
| 2003/0009425 A1* | 1/2003 | Stonedahl ............ G06Q 10/087 |
| | | 705/51 |
| 2009/0177739 A1* | 7/2009 | Uslontsev .............. G06Q 10/08 |
| | | 715/236 |
| 2009/0314835 A1 | 12/2009 | Jackson |
| 2009/0319078 A1 | 12/2009 | Jackson |
| 2014/0214713 A1* | 7/2014 | Srinath ................. G06Q 30/06 |
| | | 705/330 |
| 2014/0279648 A1* | 9/2014 | Whitehouse ......... G06Q 10/083 |
| | | 705/330 |
| 2014/0379604 A1* | 12/2014 | Bodenhamer .... G06Q 10/08345 |
| | | 705/330 |
| 2015/0066798 A1* | 3/2015 | Gillen ............... G06Q 10/0835 |
| | | 705/336 |
| 2015/0324733 A1 | 11/2015 | Goodall et al. |
| 2015/0324745 A1 | 11/2015 | Goodall et al. |
| 2016/0232489 A1* | 8/2016 | Skaaksrud ......... G06Q 10/0836 |
| 2017/0063806 A1* | 3/2017 | Dick ................... H04L 63/0428 |
| 2020/0210949 A1* | 7/2020 | Mugar .................... H04W 4/00 |
| 2020/0250724 A1* | 8/2020 | Sanders ............. G06Q 30/0621 |
| 2023/0359268 A1* | 11/2023 | Letkeman ............. G06F 3/0488 |

* cited by examiner

SHIPPING ITEMS USING AN ELECTRONIC SHIPPING LABEL DEVICE

CROSS-REFERENCE TO RELATED APPLICATION

This application is a non-provisional patent application of and claims the benefit to U.S. Provisional Patent Application No. 62/841,062, filed Apr. 30, 2019, and titled "System and Method for Shipping Items Using an Electronic Shipping Label Device," the disclosure of which is hereby incorporated herein by reference in its entirety.

FIELD

The described embodiments relate generally to a system and device for using an electronic shipping label. More particularly, the present embodiments relate to a system that is adapted to formulate a custom shipping label image for an electronic shipping label device and configure the electronic shipping label device using a graphical user interface of a portable electronic device.

BACKGROUND

Traditionally, shipping a parcel or other container, including luggage or suitcases, golf travel bags, shipping containers, and the like, requires a printed label that is adhered to the parcel or other container. The need for a printed shipping label creates numerous challenges for customers. In some cases, the need for a printed label means that customers must visit a physical location of a shipping carrier to request services and drop off their parcel to be shipped. In other cases, customers must print a label on their own and affix the label to their parcel, which may be difficult and time-consuming. In addition, in the event that a customer wants to update shipping preferences, such as changing a date of arrival or a destination address, an entirely new label must be printed and affixed to the parcel, often requiring the steps above to be repeated. In many cases, the shape of certain parcels makes adhering a label to the parcel difficult for both customers and shipping carrier agents.

SUMMARY

Embodiments of the systems, devices, methods, and apparatuses described in the present disclosure are directed to systems and methods for configuring an electronic shipping label device for use in shipping an item.

The embodiments described herein may include a method for configuring an electronic shipping label device. The method may include receiving, at a system server, from a portable electronic device, an initiation request corresponding to a shipment of an item using the electronic shipping label device. The initiation request may be transmitted in response to the portable electronic device receiving a request to initiate the shipment at a graphical user interface operated on the portable electronic device. The method may further include transmitting a shipping request to a third-party system. The shipping request may include shipping parameters corresponding to the shipment. The method may further include receiving shipment information from the third-party system in response to the shipping request. The shipment information may include a third-party shipping label image. The method may further include determining a layout for a custom shipping label image for display on the electronic shipping label device. The custom shipping label image may include a set of custom label elements and the layout may specify target dimensions and a position for each of the set of custom label elements. The method may further include analyzing the third-party shipping label image to identify a set of third-party label elements and identifying a transformation for each of the set of third-party label elements. The method may further include generating each of the set of custom label elements by performing a respective transformation on a corresponding third-party label element in accordance with a respective set of target dimensions of the layout. The method may further include generating the custom shipping label image using the set of custom label elements and the layout. The method may further include transmitting the custom shipping label image to the portable electronic device. The portable electronic device may be configured to transmit the custom shipping label image to the electronic shipping label device for display at an electronic paper display of the electronic shipping label device.

The embodiments described herein may further include an additional method for configuring an electronic shipping label device. The method may include receiving, at a graphical user interface operated on a host device, a request to initiate a shipment of an item using the electronic shipping label device and destination information corresponding to the shipment. The method may further include transmitting the destination information and an initiation request to a system server. The method may additionally include receiving a third-party shipping label image corresponding to the shipment. The method may include determining a first transformation to perform on a first third-party label element of the set of third-party label elements to generate a first custom label element for a custom shipping label image. The first transformation may be determined based on a first element type determined for the first third-party label element and first target dimensions for the first custom label element. The method may further include determining a second transformation, different from the first transformation, to perform on a second third-party label element of the set of third-party label elements to generate a second custom label element for the custom shipping label image. The second transformation may be determined based on a second element type determined for the second third-party label element and second target dimensions for the second custom label element. The method may further include generating the first custom label element by performing the first transformation on the first third-party label element and generating the second custom label element by performing the second transformation on the second third-party label element. The method may further include generating the custom shipping label image using the first custom label element and the second custom label element and transmitting the custom shipping label image to the electronic shipping label device for display on a display of the electronic shipping label device.

The embodiments described herein may additionally include a system that includes an electronic shipping label device, a host device, and a system server. The electronic shipping label device may include an enclosure defining an opening, an attachment mechanism configured to attach the enclosure to an item, a battery positioned within the enclosure, an electronic paper display positioned at least partially within the opening and configured to display a custom shipping label image, a processing unit positioned within the enclosure and configured to control a graphical output of the electronic paper display, and a wireless network communication interface operably coupled to the processing unit. The host device may be operably coupled to the electronic shipping label device and may include a graphical user interface configured to receive shipping parameters corresponding to the shipment. The system server may be operably coupled to the host device and may be configured to receive, from the host device, the shipping parameters and an initiation request regarding the shipment, transmit a shipping request and the shipping parameters to a third-party system, and receive a third-party shipping label image for the shipment from the third-party system. The system server may be further configured to analyze the third-party shipping label image to identify a set of third-party label elements, perform a first transformation on a first third-party label element of the set of third-party label elements to generate a first custom label element of the custom shipping label image, perform a second transformation on a second third-party label element of the set of third-party label elements to generate a second custom label element of the custom shipping label image, generate the custom shipping label image using the first custom label element and the second custom label element, and transmit the custom shipping label image to the host device. The host device may be configured to transmit the custom shipping label image to the electronic shipping label device. The electronic shipping label device may be configured to receive the custom shipping label image and display the custom shipping label image using the electronic paper display.

In addition to the example aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

Figure 1:
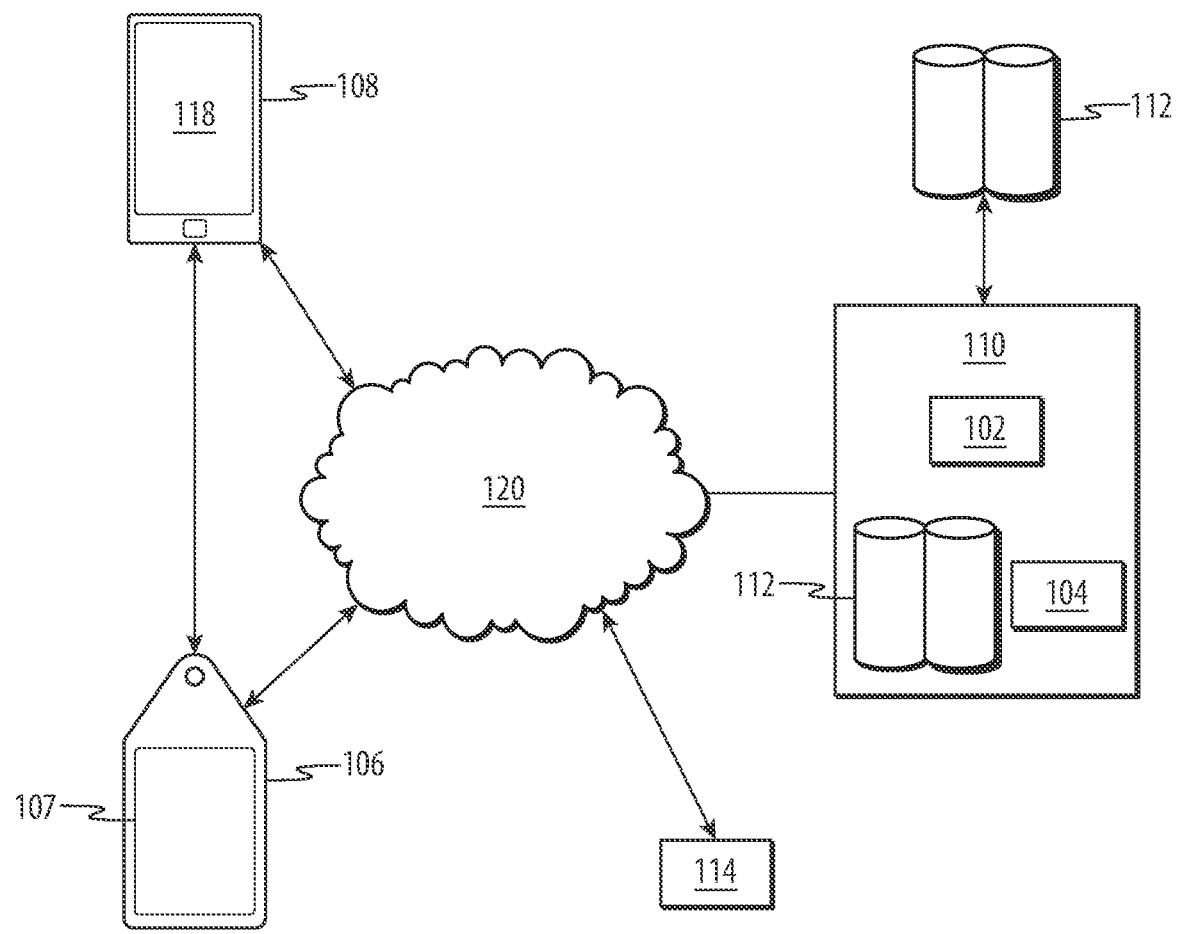
FIG. 1 depicts an example system for configuring an electronic shipping label device for use in shipping an item, such as a golf bag.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

Embodiments of the present disclosure are directed to a system for shipping one or more items, such as a golf bag containing golf clubs, luggage, shipping containers, and the like, using an electronic shipping label device. Transporting large or irregularly shaped items, such as golf clubs and golf bags, can be particularly challenging, because travelling with these items is difficult, and shipping these items is inconvenient. Golf bags and similar items may be heavy, large, and cumbersome, making them difficult to carry and hard to fit in automobiles. For travel that includes flying, many airlines charge fees for baggage and extra fees for oversized baggage.

Some travelers choose to ship their belongings using a shipping carrier, which provides a host of additional challenges. For example, users must visit a shipping carrier location, which is inconvenient for the reasons discussed above, or print and affix a paper shipping label to their item, which is inconvenient as well. For example, users may not have access to a printer or tape, and affixing the label to the item may be difficult if there is not a large planar surface that is well-suited for receiving an adhesive label. In addition, in the event that a customer wants to update shipping preferences, such as changing a date of arrival or a destination address, an entirely new label must be printed and affixed to the item, often requiring the steps above to be repeated.

The systems described herein use an electronic shipping label device for shipment of a golf bag, suitcase or other luggage, shipping containers, and other shippable objects or containers. The electronic shipping label device may display a custom shipping label image and may be attached to an item for shipment of the item from an origin to a destination.

A host device, such as an electronic device of a user, may configure the electronic shipping label device to display the custom shipping label image. The host device may be operably coupled to and configured to communicate with a system server of a shipping management system to provide shipping parameters corresponding to the shipment and receive shipment information regarding the shipment. The shipment information may include a third-party shipping label image. In some cases, the third-party shipping label image may be incompatible or otherwise unsuitable for display on the electronic shipping label device. The system server may formulate a custom shipping label image. Formulating the custom shipping label image may include analyzing the third-party shipping label image to determine third-party label elements and generating custom label elements for the custom shipping label image based on the third-party label elements. The custom shipping label image may be specifically formatted for the electronic shipping label device.

The host device may transmit the custom shipping label image to the electronic shipping label device for display. The electronic shipping label device allows users to perform the entire process of preparing the item for shipping using the host device. This obviates the need to print and attach a paper label to the item. In doing so, the electronic shipping label device allows users to overcome obstacles that exist with traditional shipping processes.

In various embodiments, the electronic shipping label device may be reused for multiple shipments. For example, if a shipment is concluded or modified, the shipping label image displayed by the electronic shipping label device may be updated or replaced (e.g., using the host device) to display a new shipping label image corresponding to a new or modified shipment. This provides an improvement over traditional shipping labels, which are typically discarded after a single shipment. As such, the electronic shipping label devices described herein provide a more environmentally friendly solution for shipping items, such as golf clubs.

Users may provide shipping parameters corresponding to a shipment using an interface provided at the host device. As used herein, "shipping parameters" may refer to information regarding a shipment. Example shipping parameters include destination information (including a destination address), a return or origin address, shipment initiation date, shipment delivery date, billing information (payment information, billing address, etc.), customer contact information (e.g., recipient name, phone number, email address), shipment item information (e.g., type of item, number of items in a shipment, item weight, packaging information), shipping insurance preferences, and the like. Shipping parameters may be transmitted from the host device to the system server for storage and/or use by the shipping management system.

To initiate a shipment, a user may provide shipping parameters using the host device. The shipping parameters may be sent to the system server as part of an initiation request. The system server may receive the initiation request and transmit a shipping request including the shipping parameters to a third-party system. The third party system may include a computing network associated with one or more parties that provide shipping services (e.g., shipping carriers, shipping brokers, and the like). In response to the shipping request, the system server may receive shipment information indicating an agreement to perform the shipment by a shipping carrier. The shipment information may include tracking information, shipping parameters, and the like. The shipment information may include a third-party shipping label image, portions or elements of a third-party shipping label image, or other information that may be used to formulate a custom shipping label image. The system server may formulate and transmit the custom shipping label image to the host device. The host device may be operably coupled to the electronic shipping label device, for example by a personal area network connection (e.g., a BLUETOOTH LE network), a cellular network (e.g., GSM, LTE, or other cellular network), or another type of network. The host device may transmit the custom shipping label image and/or other shipment information for display to the electronic shipping label device for display at a display of the electronic shipping label device.

In some cases, the display of the electronic shipping label device is an electronic paper (e.g., electronic ink or e-ink) display. In some cases, the graphical output of the display is persistent. As used herein, a "persistent graphical output" may refer to a graphical output that, once it is provided (e.g., once a shipping label image or other shipment information is displayed on the display), the graphical output may be maintained on the display indefinitely and/or without consuming power from and internal power source (e.g., a battery) or an external power source. In some cases, the display is configured to maintain the graphical output (e.g., the shipping label image) on the display without consuming power from and internal power source (e.g., a battery) or an external power source. In some cases, the graphical output of the display may be cleared from the display and a new graphical output may be provided, for example to display a new shipping label image or shipment information corresponding to a different shipment of an item. In some cases, one or more portions of the graphical output of the display may be updated or altered without clearing the graphical output from the display. In some cases, the display mimics the appearance of ordinary ink on paper. The electronic paper display may be implemented using any suitable technology, including electrophoretic display technology, electrowetting display (EWD) technology, electrofluidic display technology, and the like.

The custom shipping label image may provide information regarding the shipment, including shipping parameters, such as addresses and the like. The electronic shipping label device may be attached to an item (e.g., a golf bag, a suitcase, luggage, a shipping container, or other items) to provide the information contained in the custom shipping label image to the carrier during the shipment. In some cases, the electronic shipping label device includes an attachment mechanism for attaching the electronic shipping label device to the golf bag. The attachment mechanism may allow the electronic shipping label device to be releasably attached to the item so that the electronic shipping label device may be removed from the item and placed on another item. In some cases, the electronic shipping label device is permanently attached or integrated with a shippable item, such as a golf bag, suitcase, shipping container, or the like.

The term "attached," as used herein, may be used to refer to two or more elements, structures, objects, components, parts or the like that are physically affixed, fastened, and/or retained to one another. The term "coupled," as used herein, may be used to refer to two or more elements, structures, objects, components, parts or the like that are physically attached to one another, operate with one another, communicate with one another, are in electrical connection with one another, and/or otherwise interact with one another. Accordingly, while elements attached to one another are coupled to one another, the reverse is not required. As used herein, "operably coupled" or "electrically coupled" may be used to refer to two or more devices that are coupled in any suitable manner for operation and/or communication, including wiredly, wirelessly, or some combination thereof.

These and other embodiments are discussed below with reference to FIGS. 1-10. However, those skilled in the art will readily appreciate that the detailed description given herein with respect to these figures is for explanatory purposes only and should not be construed as limiting.

FIG. 1 depicts an example system for configuring an electronic shipping label device for use in shipping an item, such as a golf bag. The system 100 includes an electronic shipping label device 106, a host device 108, a system server 110, and one or more third party systems 114. They system 100 also includes a network 120 that enables communication between the electronic shipping label device 106, the host device 108, the system server 110, and the one or more third party systems 114.

In accordance with the embodiments described herein, the electronic shipping label device 106 may include a display 107 for displaying a graphical output. In some cases, the graphical output may be a shipping label image or shipment information corresponding to a shipment of an item by a shipping carrier. In some cases, the electronic shipping label device 106 is attached to the item, and the displayed shipping label image is used by the shipping carrier to ship the item from an origin to a destination. Example electronic shipping label devices are described in more detail below with respect to FIGS. 7 and 9.

In some cases, the host device 108 is used to configure the graphical output of the electronic shipping label device 106 by sending commands, shipment information, and/or shipping label images to the electronic shipping label device. The host device 108 may be operably coupled to the system server 110 and/or the third party systems 114 (e.g., a shipping carrier system) to transmit shipping parameters corresponding to the shipment of the item and receive shipping label images and/or other shipment information corresponding to the shipment.

In some cases, the host device 108 transmits an initiation request with shipping parameters to the system server 110 to initiate a shipment process. The system server 110 may communicate the shipping parameters to one or more third party systems 114 (e.g., a shipping carrier system) as part of a shipping request. A third party system 114 may respond to the shipping request by transmitting shipment information, including a shipping label image or shipment information to be displayed by the electronic shipping label device 106 portions or elements of a shipping label image, or other information that may be used to formulate a shipping label image. The system server 110 may formulate the shipping label image and transmit the shipping label image and/or other shipment information to the host device 108, and the host device 108 may transmit the shipping label image to the electronic shipping label device 106 for display on the display 107.

In some cases, the display 107 is an electronic paper (e.g., electronic ink or e-ink) display. In some cases, as noted above, the graphical output provided by the display is persistent in that once the graphical output of the display 107 is set (e.g., once a shipping label image is displayed on the display 107), the graphical output may be maintained on the display indefinitely without electricity and/or without consuming power from and internal power source (e.g., a battery) or an external power source. In some cases, the graphical output of the display 107 may be cleared from the display and a new graphical output may be provided, for example to display a new shipping label image corresponding to a different shipment of an item. In some cases, one or more portions of the graphical output of the display 107 may be updated or altered without clearing the graphical output from the display. In some cases, the display 107 mimics the appearance of ordinary ink on paper. The electronic paper display may be implemented using any suitable technology, including electrophoretic display technology, electrowetting display (EWD) technology, electrofluidic display technology, and the like.

As noted above, the host device 108 may by operably coupled to the electronic shipping label device 106 and may transmit data (e.g. image data corresponding to a shipping label image) and commands to the electronic shipping label device. Commands sent from the host device 108 to the electronic shipping label device 106 may include a command to display a shipping label image using the display 107, a command to clear or modify the graphical output of the display 107, a status update request, and the like. The electronic shipping label device 106 may provide responses to commands or otherwise communicate with the host device 108 to indicate that a shipping label image has been received, to indicate that the electronic shipping label device has executed commands (e.g., that the graphical output of the display 107 has been cleared or modified, that the display 107 has been updated to display a shipping label image), and/or to provide status updates (e.g., device memory availability, device error reports, battery status). Commands and data transmitted between host devices and electronic shipping label devices are discussed in more detail below with respect to FIGS. 2 and 4.

The host device 108 may be a portable electronic device or a personal electronic device including, for example, a mobile phone, tablet, or other similar device. However, the host device 108 may be one of a variety of computing devices including, for example, a personal computer, work station, terminal, mobile computer, mobile device, smartphone, tablet, a multimedia console, or the like. In some case, the host device 108 is connected to the electronic shipping label device 106 via a local area network or a personal area network, (e.g., WI-FI, BLUETOOTH LE, etc.), a cellular network (e.g., GSM, LTE, or other cellular network), or the like. In some cases, the electronic shipping label device 106 may connect directly with the shipping management system 102.

In some cases, the host device 108 provides an interface 118 (e.g., a graphical user interface) for a user to access a shipping management system 102 executed or otherwise embodied on the network 120. For example, users may initiate a shipping process, provide shipping parameters, and the like using the interface 118. The interface 118 may be implemented via a web browser or other Internet-enabled interface, such as executing as an application within an operating system the host device 108. In some embodiments, a component or portion of the shipping management system 102 is executed on a system server 110 or other network device(s) connected via the network 120. The shipping management system 102 may also be operably connected to one or more databases 112. Thus, at least one component or portion of the shipping management system 102 may be executed on the system server 110 and/or one or more portions may be executed on the host device 108 (e.g., through the interface 118). The interface 118 is discussed in more detail below with respect to FIG. 8.

In general, the system server 110 hosts the shipping management system 102. In some implementations, the system server 110 also hosts a web server 104 or an application that users may use to access components of the system 100. The system server 110 may include a single server, a plurality of servers with each such server being a physical server or a virtual machine, or a collection of both physical servers and virtual machines. In another implementation, a distributed network (e.g., a cloud computing system) hosts one or more components of the system 100.

In some cases, the shipping management system 102 may communicate with one or more third party systems 114 connected to or otherwise in communication with the network 120. For example, a third party system 114 may include a computing network associated with one or more parties that provide shipping services (e.g., shipping carriers, shipping brokers, and the like). The shipping management system 102 may communicate with the third party systems 114 to request and receive shipping quotes, enter into shipping agreements, receive shipment information (including shipping label images), and the like.

In some cases, the label formatting of a third-party shipping label image received from a third-party system 114 may be incompatible with the electronic shipping label devices 106. It may be difficult or impossible for the electronic shipping label devices 106 to properly display some third-party shipping label images as they are received due to formatting characteristics of the third-party shipping labels. For example, it may be difficult or impossible for the display 107 of an electronic shipping label device 106 to display a third-party shipping label image based on its resolution, size, or aspect ratio. A resolution of the third-party shipping label image may be greater than a resolution of the display 107. Similarly, scaling a third-party shipping label image to a size or aspect ratio of the display 107 may result in data corruption or loss as a result of scaling problems, resolution problems, and other issues. Additionally, third-party shipping label images received from different shipping carriers may be formatted differently from one another, including having different sizes, aspect ratios, resolutions, arrangements of elements, and other characteristics. As a result, it may be difficult or impossible for the electronic shipping label devices 106 to properly display some or all third-party shipping label images as they are received.

The shipping management system 102 and/or the host device 108 may be configured to extract relevant information from shipping label images to construct custom label images for the electronic shipping label devices 106. The custom shipping label images may be formatted such that the electronic shipping label devices 106 can properly display the necessary information contained in third-party shipping labels. This may also allow the shipping management system 102 to facilitate shipments using multiple different shipping carriers.

The shipping management system 102 may also communicate with other systems using the network 120. For example, the shipping management system 102 may communicate with one or more databases 112 available to access and store information via the network 120. For example, user information and/or shipping parameters may be stored in the database 112. User information may include user preferences, default shipping parameters, user account information, and the like.

The databases 112 may include an inventory of electronic shipping label devices 106. This inventory may be updated as devices are delivered from the manufacturer. The inventory may be updated manually or by utilizing an application programming interface to receive inventory information from one or more manufacturers in real-time. Inventory information may also be received in a specially formatted document file. The inventory information may then be imported into the system using an administrative user interface. Each electronic shipping label device 106 may be identified by a unique ID that can be used to store information about that device in the database 112.

The shipping management system 102 may provide an interface for allowing electronic shipping label devices 106 to be purchased. A customer may provide identifying information, including, name, address, phone number, and email address. The customer may also provide payment information that can be used to pay for the electronic shipping label device 106. Once the payment is completed the electronic shipping label devices 106 purchased will be assigned to the user in the inventory database.

The shipping management system 102 may provide an interface that allows the customer to manage their inventory of electronic shipping label devices 106. The customer may be able to view their electronic shipping label devices 106 in an account management interface. This interface may contain an image of the last label image downloaded to an electronic shipping label device 106. This interface may also allow the customer to view real-time tracking information on the electronic shipping label device 106 if the device is so equipped. Real-time tracking information may be implemented in a number of ways, including GPS, IP address tracking, cell phone tower triangulation or other means. The tracking information may also reflect the last known location of the digital label. This may be useful where luggage is lost or stolen.

The shipping management system 102 may provide an interface that allows the user to store information about each electronic shipping label device 106 they own or are otherwise associated. The user may be able to assign each electronic shipping label device 106 a name, description, number, or other descriptive properties to personalize the electronic shipping label device record. This system may be configured to allow the customer to add an electronic shipping label device 106 to the customer's profile, temporarily allow the electronic shipping label device to be added if it is being properly shared, or refuse to add the electronic shipping label device if it has been reported stolen.

The network 120 may include personal area networks, local area networks, and/or large area networks that are configured to relay data to the various devices of the system 100. The network 120 may include, for example, the Internet, an intranet, an Ethernet network, a wired network, a wireless network, or the like. In some cases, the network 120 includes multiple types of networks. For example, the host device 108 may be connected to the electronic shipping label device 106 via a personal area network (e.g., a BLUETOOTH LE network) or a cellular network (e.g., GSM, LTE, or other cellular network), and the host device 108 may be connected to the system server 110 via a large area network (e.g., the Internet). The cellular connection allows the label data to be updated remotely if the customer is separated from the package. For example, to update an electronic shipping label device 106 while a shipment is in transit.

Figure 2:
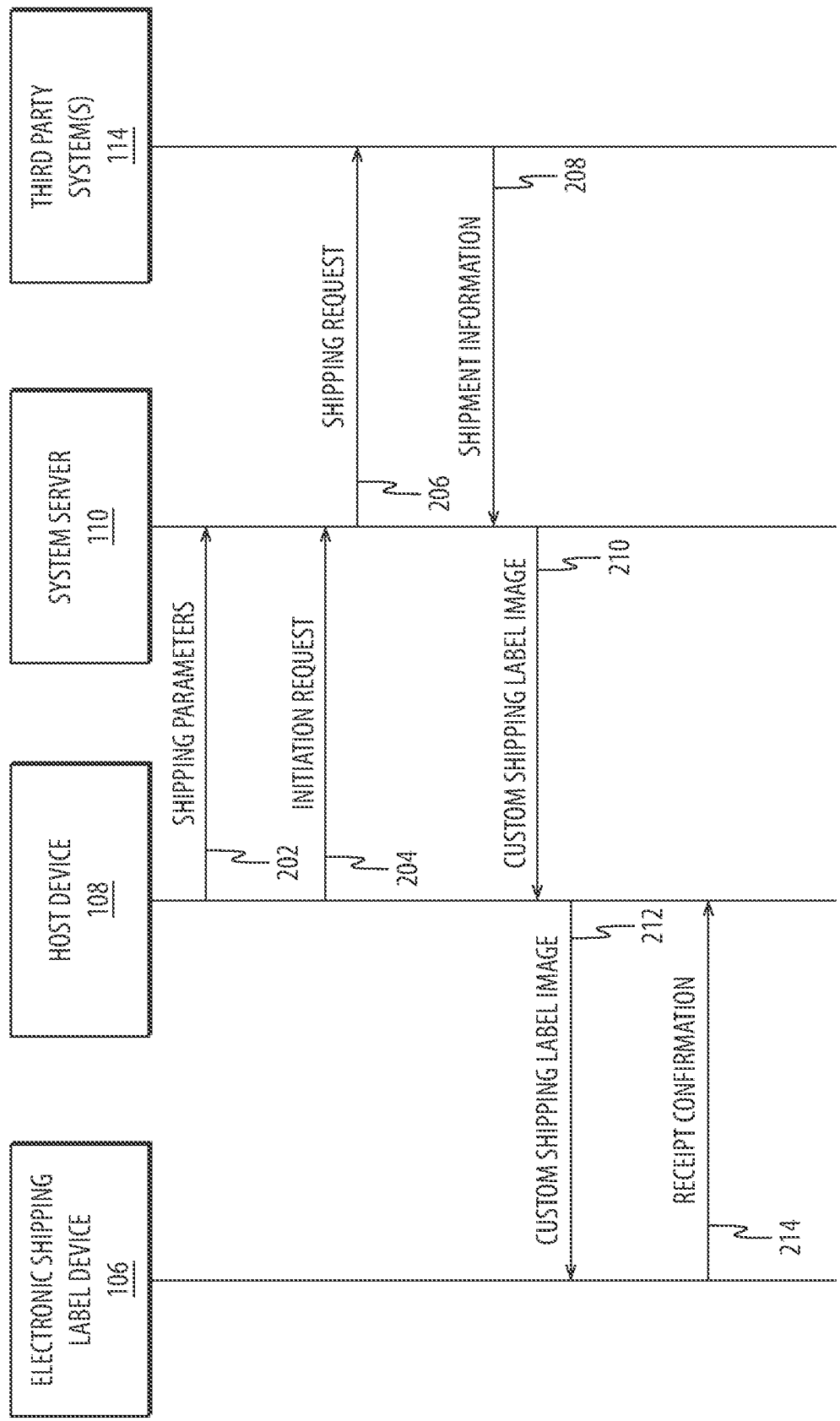
FIG. 2 is a flow diagram depicting example operations of a method for configuring an electronic shipping label device for use in shipping an item.

FIG. 2 is a flow diagram depicting example operations of a method 200 for configuring an electronic shipping label device for use in shipping an item. In some cases, the method 200 may be performed using the electronic shipping label device 106, the host device 108, the system server 110, and the third party system(s) 114 discussed above with respect to FIG. 1.

At operation 202, the host device 108 transmits shipping parameters corresponding to a shipment to the system server 110. The shipping parameters may include information regarding a shipment. Example shipping parameters include destination addresses, return or origin addresses, shipment initiation date, shipment delivery date, billing information (payment information, billing address, etc.), customer contact information (e.g., names, phone numbers, email addresses, etc.), shipment item information (e.g., type of item, number of items in a shipment, item dimensions, item weight, packaging information), shipping insurance preferences, and the like.

Figure 8:
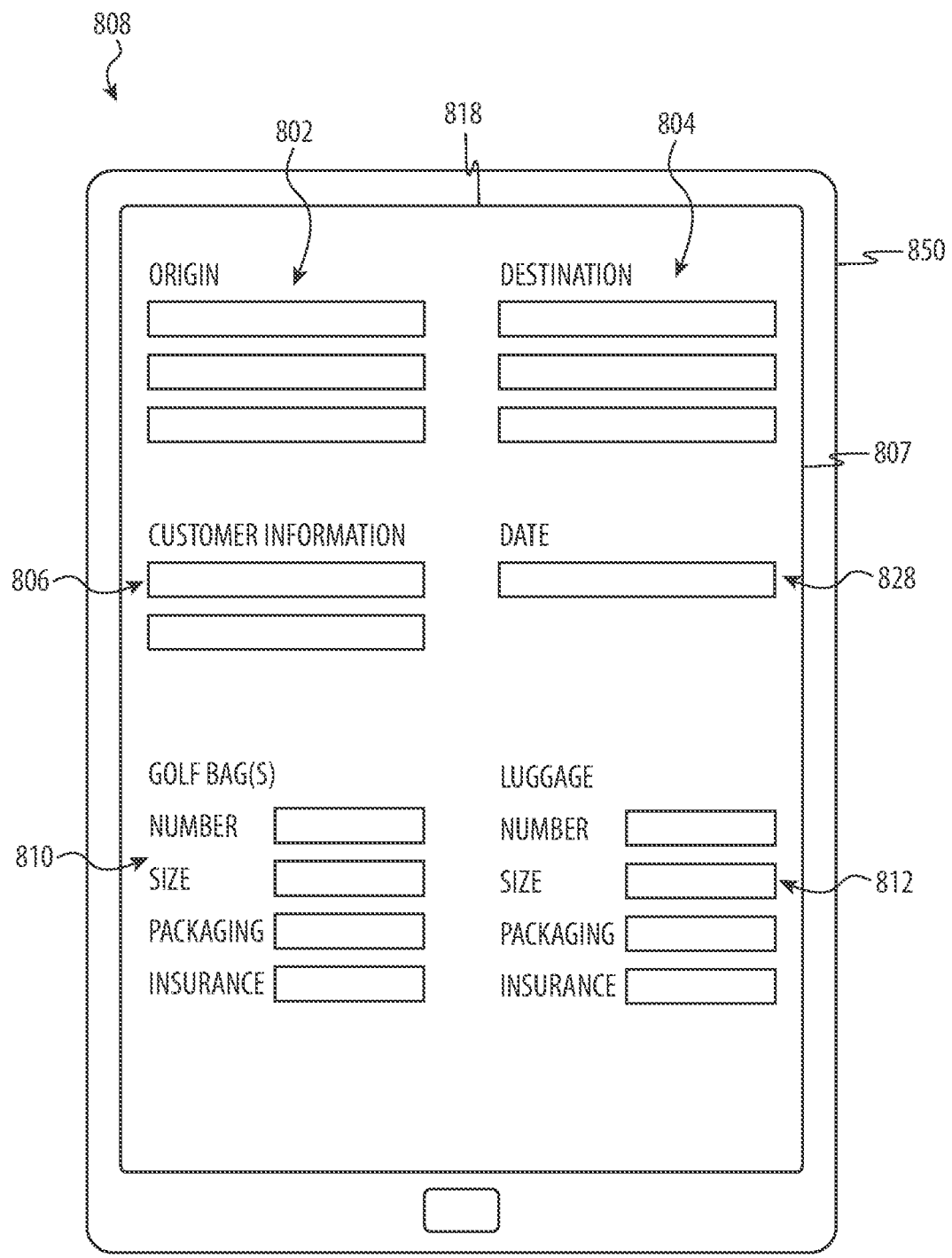
FIG. 8 depicts an example interface of a host device that may be used to access a shipping management system.

Shipping parameters may be received via the interface 118 of the host device 108, as discussed with respect to FIGS. 1 and 8. In some cases, shipping parameters may be received by a host device 108 and stored in at the system server 110, for example as part of a user's account of the shipping management system 102. In some cases, shipping parameters are stored at the host device 108 after receipt at the host device 108 and transmitted to the system server 110 as needed, such as with an initiation request.

In some cases, shipping parameters corresponding to a particular shipment may be received at multiple different times and/or from multiple different host devices 108. In some cases, some shipping parameters may be stored by the shipping management system 102 and reused for multiple different shipments. For example, customer contact information, addresses, and billing information may be received once and stored at the shipping management system 102, and used as shipping parameters for multiple subsequent shipments. Other shipping parameters, such as shipment item information, addresses, and dates may be received from users for each shipment.

At operation 204, the host device 108 transmits an initiation request to the system server 110. The initiation request notifies the shipping management system 102 that a user wishes to initiate a shipment. An initiation request may be transmitted to the system server 110 in response to a user initiating a shipment using the interface 118 of the host device 108. As noted above, the initiation request may include some or all of the shipping parameters corresponding to the shipment.

At operation 206, the system server 110 transmits a shipping request corresponding to the shipment to one or more third party systems 114. The shipping request may be sent in response to receipt of the initiation request. In some cases, the shipping request includes shipping parameters corresponding to the shipment. As noted above, the shipping parameters may be received as part of the initiation request and/or retrieved from storage at the system server 110. The shipping request may be sent to one or more shipping carriers or other shipping service providers to request performance of the shipment desired by the user.

In some cases, the system server 110 may send a request for a price quote corresponding to the shipment to the third party system(s) prior to transmitting the shipping request. The system server 110 may receive one or more price quotes in response to the shipping request. In some cases, the system server 110 selects the best price or otherwise selects the best price quote automatically. In some cases, the system server 110 transmits information regarding the price quote(s) to the host device 108 and allows the user to select from one or more options or cancel the shipment. In response to selection of a quote, the system server 110 may transmit the shipping request to the selected carrier or broker.

At operation 208, the system server 110 receives shipment information corresponding to the shipment from one or more third party systems 114. In some cases, shipment information is received in response to the shipping request. Shipment information is information provided by a third-party system 114 that will perform the shipment. Shipment information may include a third-party shipping label image, third-party label elements, or other shipping label information, tracking information, payment confirmation information, and the like. The shipment information may be stored at the system server 110. In some cases, a third-party shipping label image is generated by and received from the third-party system.

As noted above with respect to FIG. 1, in some cases, a third-party shipping label image received from a third-party system 114 may be incompatible with the electronic shipping label devices 106. It may be difficult or impossible for the electronic shipping label devices 106 to properly display some third-party shipping label images as they are received due to formatting characteristics of the third-party shipping labels. For example, it may be difficult or impossible for the display 107 of an electronic shipping label device 106 to display a third-party shipping label image based on its resolution, size, or aspect ratio. A resolution of the third-party shipping label image may be greater than a resolution of the display 107. Similarly, scaling a third-party shipping label image to a size or aspect ratio of the display 107 may result in data corruption or loss as a result of scaling problems, resolution problems, and other issues. Additionally, third-party shipping label images received from different shipping carriers may be formatted differently from one another, including having different sizes, aspect ratios, resolutions, arrangements of elements, and other characteristics. As a result, it may be difficult or impossible for the electronic shipping label devices 106 to properly display some or all third-party shipping label images as they are received.

In some cases, a custom shipping label image is formulated by the system server 110 based on the shipment information. In some cases, formulating the shipping label image includes reformatting, resizing, or otherwise processing a third-party shipping label image for display using the electronic shipping label device 106. The system server 110 may extract relevant information from shipping label images to construct custom shipping label images for the electronic shipping label devices 106. The custom label images may be formatted such that the electronic shipping label devices 106 can properly display the necessary information contained in third-party shipping labels.

In various embodiments, formulating a custom shipping label image may include extracting third-party label elements from a third-party shipping label image, generating custom label elements for the custom shipping label image, and/or assembling the custom shipping label image using the custom label elements. Formulating a custom shipping label may additionally or alternatively include modifying a third-party shipping label image received from the third-party system, assembling and/or modifying portions or elements of multiple third-party shipping label images, assembling and/or modifying shipment information and/or information stored at the system server 110, and the like. The host device and/or the system server may formulate the custom shipping label image based on information regarding the electronic shipping label device, including a storage capacity of a memory, display resolution, display size, display aspect ratio. The information about the electronic shipping label device may be received from the electronic shipping label device and/or stored at the host device and/or the system server.

In some cases, formulating a custom shipping label image may include identifying third-party label elements of a third-party shipping label image and performing item-by-item transformations on each third-party label elements to generate custom label elements for the custom shipping label image. In various embodiments, scaling or otherwise uniformly converting an entire third-party label image for display on an electronic shipping label device may not be feasible, so different third-party label elements of a third-party shipping label image may undergo different transformations. Formulating custom shipping label images is discussed in more detail below with respect to FIGS. 5A, 5B, and 6.

At operation 210, the system server 110 transmits the custom shipping label image corresponding to the shipment to the host device 108. In some cases, the system server 110 transmits the shipment information to the host device 108, and the host device 108 formulates the custom shipping label image. In some cases, the system server 110 transmits additional shipment information along with the custom shipping label image to the host device 108 for storage at the host device 108 and/or access or viewing by the user. This may include shipment information that is not included in the third-party shipping label image and/or the custom shipping label image.

At operation 212, the host device 108 transmits the custom shipping label image to the electronic shipping label device 106 for display on the electronic shipping label device 106. The custom shipping label image may be specifically formatted for proper display on a display of the electronic shipping label device. In some cases, portions of the custom shipping label image may be sent separately. For example, custom shipping label image data may be divided into packets that are sent to the electronic shipping label device 106 at different times.

In some cases, the host device 108 transmits commands to the electronic shipping label device 106 in addition to the image data corresponding to the custom shipping label image. Commands may be sent before, during, or after sending the custom shipping label image data. For example, in some cases, the host device 108 transmits a command to clear a memory and/or a display of the electronic shipping label device 106 prior to sending the custom shipping label image data. The electronic shipping label device 106 may clear graphical output (e.g., a prior shipping label image) from the display and/or delete image data (e.g., shipping label image data) from the memory in response to receiving the command. In some cases, electronic shipping label device 106 may clear graphical output (e.g., a prior shipping label image) from the display and/or delete image data (e.g., shipping label image data) from the memory automatically in response to receiving new image data, after a predetermined time period, or the like. In some cases, the host device 108 transmits a command to display the shipping label image using the display after the custom shipping label image is received by the electronic shipping label device 106. In some cases, the host device 108 transmits status requests or requests for confirmation of receipt of image data and/or commands.

In response to receiving the custom shipping label image, the electronic shipping label device 106 may display the custom shipping label image on a display of the electronic shipping label device. The custom shipping label image may provide information regarding the shipment, including shipping parameters, such as addresses and the like, as discussed in more detail below with respect to FIGS. 5A and 5B. The electronic shipping label device 106 may be attached to the shipment item and tendered to the shipping carrier for transport.

As noted above, in some cases, the display is an electronic paper display. In some cases, once the custom shipping label image is displayed, it may be maintained on the display indefinitely without electricity and/or without regard to whether the electronic shipping label device 106 is in communication with the host device 108.

At operation 214, the electronic shipping label device 106 transmits confirmation to the host device 108 that the custom shipping label image has been received. The electronic shipping label device 106 may transmit the confirmation in response to a request for confirmation or without a request. In some cases, the confirmation indicates that a portion (e.g., a packet) of the custom shipping label image data has been received, and multiple confirmations are transmitted to the host device 108 during and/or transfer of the custom shipping label image data. In some cases, the electronic shipping label device 106 performs a verification of received and/or stored data to ensure data quality or detect errors, for example using a checksum. In some cases, the confirmation sent to the electronic shipping label device 106 may include a checksum result. In some cases, the electronic shipping label device 106 may transmit confirmation that commands have been received.

In some cases, after a shipment has been completed (e.g., the item has been delivered or the shipment canceled), or in the event that a shipment is modified, the custom shipping label image displayed by the electronic shipping label device 106 may be modified or cleared and replaced (e.g., in response to a command from the host device 108). One or more of the operations of the method 200 may be repeated to modify or clear and replace the custom shipping label image displayed by the electronic shipping label device 106.

In some cases, updated shipping parameters are received for a shipment. For example, a user may change a destination address, an arrival date, or the like. In some cases, the custom shipping label image is already displayed by the electronic shipping label device 106. The host device 108 may receive updated the shipping parameters corresponding to the shipment and transmit the updated shipping parameters to the system server 110. The system server 110 may transmit an updated shipping request to the third-party system corresponding to the shipping carrier for the shipment and may receive updated shipment information, such as an updated third-party shipping label image, in response. The system server 110 and/or the host device 108 may modify the custom shipping label image and/or formulate an updated custom shipping label image and transmit the updated custom shipping label image to the electronic shipping label device 106. In some cases, the system server 110 and/or a third-party system may communicate updates to a custom shipping label directly to the electronic shipping label device 106, for example over a cellular data network. This may allow the custom shipping label image displayed by an electronic shipping label device 106 to be updated even if it is not in communication with a host device, such as during transit. In some cases, the electronic shipping label device 106 modifies the displayed custom shipping label image (e.g., changes portions of the displayed custom shipping label image to reflect the updated custom shipping label image). In some cases, the electronic shipping label device 106 clears the displayed custom shipping label image and displays the updated custom shipping label image.

In various embodiments, multiple host devices 108 may be used with a single electronic shipping label device 106. In some cases, an electronic shipping label device 106 may be configured for a first shipment using a first host device 108 and configured for a second, subsequent shipment using a second host device 108. Similarly, a single host device 108 may be used with multiple electronic shipping label devices 106. For example, a single host device 108 may configure and manage multiple electronic shipping label devices 106 associated with the same or different shipments, having the same or different destination information, having the same or different shipping carriers, and the like.

Figure 3:
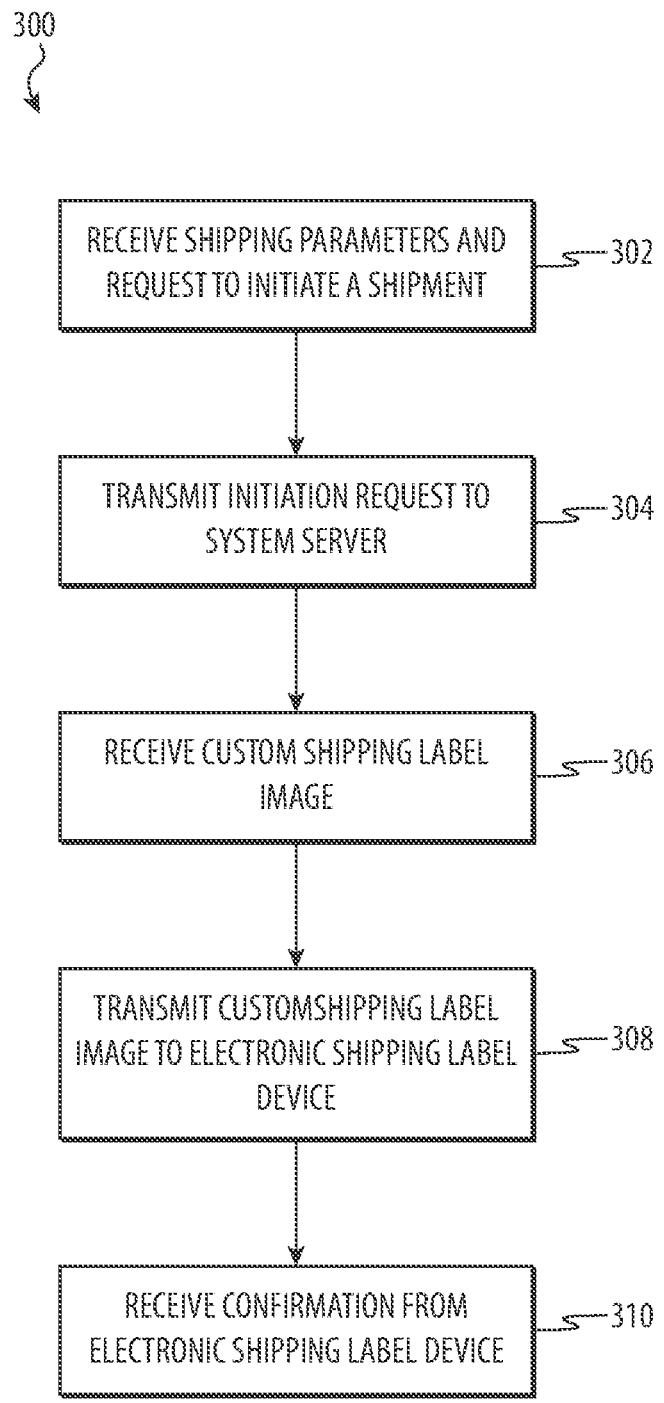
FIG. 3 is a flowchart depicting example operations of a method for configuring an electronic shipping label device for use in shipping an item.

FIG. 3 is a flowchart depicting example operations of a method 300 for configuring an electronic shipping label device for use in shipping an item. The method 300 may be performed by a host device (e.g., host device 108) or another suitable electronic device. The operations of the method 300 are discussed in more detail above with respect to FIG. 2.

At operation 302, the host device receives, at a graphical user interface operated on the host device (e.g., interface 118), a request to initiate a shipment of an item using an electronic shipping label device (e.g., electronic shipping label device 106) and shipping parameters (e.g., destination information) corresponding to the shipment.

At operation 304, the host device transmits, to a system server (e.g., system server 110), an initiation request to formulate a custom shipping label corresponding to the shipping parameters. In various embodiments, the initiation request may include some or all of the shipping parameters corresponding to the shipment of the item. In some cases, some or all of the shipping parameters may be transmitted to the system server separately from the initiation request and/or stored at the system server.

At operation 306, the host device receives the custom shipping label image for display on the electronic shipping label device. The custom shipping label image may be received from the system server. The system server may perform at least some of the steps for formulating the custom shipping label image as described below with respect to FIG. 5. For example, the system server may use a third-party shipping label image and/or other shipment information received from a third-party system in response to a shipping request that includes the shipping parameters being sent from the system server to the third-party system. The custom shipping label image may provide information regarding the shipment, including shipping parameters, such as addresses and the like, as discussed in more detail below with respect to FIG. 5B.

In some cases, the host device may perform at least some of the steps for formulating the custom shipping label image as described with respect to FIG. 5. The host device may receive a third-party shipping label image, third-party label elements, custom label elements, and/or other shipment information from the system server and/or a third-party system (e.g., a system associated with a shipping carrier). The host device and/or the system server may formulate the custom shipping label image based on information regarding the electronic shipping label device, including a storage capacity of a memory, display resolution, display size, display aspect ratio. The information about the electronic shipping label device may be received from the electronic shipping label device and/or stored at the host device and/or the system server.

At operation 308, the host device transmits the custom shipping label image to the electronic shipping label device. As noted above, the electronic shipping label device may be configured to display the custom shipping label image using a display (e.g., an electronic paper display) of the electronic shipping label device. The custom shipping label image may be specifically formatted for proper display on the display of the electronic shipping label device. As discussed in more detail with regard to FIGS. 1, 6, and 7, the electronic shipping label device may include a memory for storing the custom shipping label image and a battery for powering the electronic shipping label device. In some cases, the electronic shipping label device receives the custom shipping label image, stores the shipping label image in the memory, and displays the custom shipping label image on the display.

At operation 310, the host device receives a confirmation from the electronic shipping label device that the custom shipping label image has been received. In some cases, the electronic shipping label device displays the custom shipping label image in response to a determination that the transmission of the custom shipping label image is complete. In some cases, the electronic shipping label device determines that the transmission of the custom shipping label image is complete. In some cases, the host device determines that the transmission of the custom shipping label image is complete, for example using a checksum sent from the electronic shipping label device to the host device. The host device may send a command to the electronic shipping label device to display the custom shipping label image in response to determining that the transmission of the custom shipping label image is complete.

Figure 4:
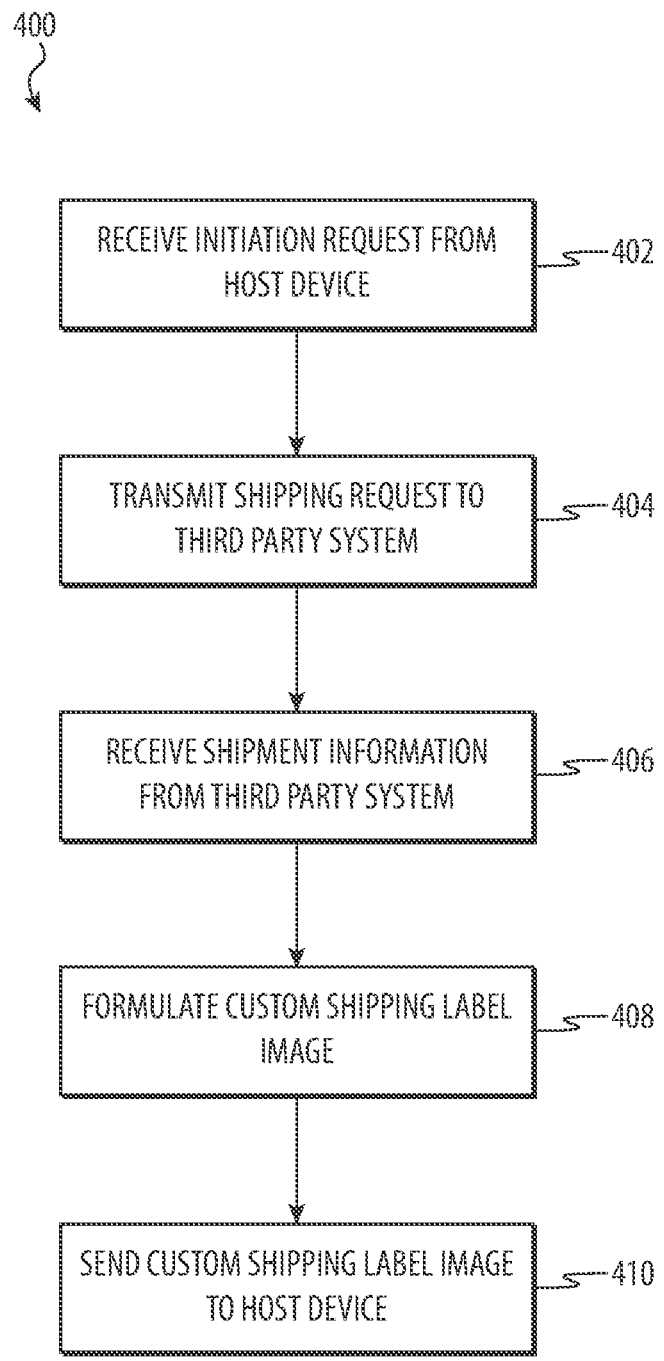
FIG. 4 is a flowchart depicting example operations of a method for configuring an electronic shipping label device for use in shipping an item.

FIG. 4 is a flowchart depicting example operations of a method 400 for configuring an electronic shipping label device for use in shipping an item. The method 400 may be performed by a system server (e.g., system server 110) or another suitable electronic device. The operations of the method 400 are discussed in more detail above with respect to FIG. 2. In some cases, the method 400 is performed in response to a user of the host device initiating a shipment of an item using an electronic shipping label device (e.g., electronic shipping label device 106) as discussed with respect to FIG. 3. At operation 402, the system server receives an initiation request from a host device (e.g., host device 108). As discussed above, the initiation request may include shipping parameters corresponding to the shipment of the item.

At operation 404, the system server transmits a shipping request to a third-party system (e.g., a third-party system 114). In some cases, the shipping request includes shipping parameters corresponding to shipment of the item as well as a request to perform shipment of the item. At operation 406, the system server receives shipment information from the third-party system. The shipment information may include tracking information, shipping parameters, and the like. The shipment information may include a third-party shipping label image, portions or elements of a third-party shipping label image, or other information that may be used to formulate a custom shipping label image. An example third-party label image is described below with respect to FIG. 5A.

At operation 408, the custom shipping label image is formulated by the system server based on received shipment information. The system server may perform at least some of the steps for formulating the custom shipping label image as described below with respect to FIG. 6. For example, the system server may use a third-party shipping label image and/or other shipment information received from a third-party system in response to a shipping request that includes the shipping parameters being sent from the system server to the third-party system. An example custom shipping label image is described below with respect to FIG. 5B.

Figure 6:
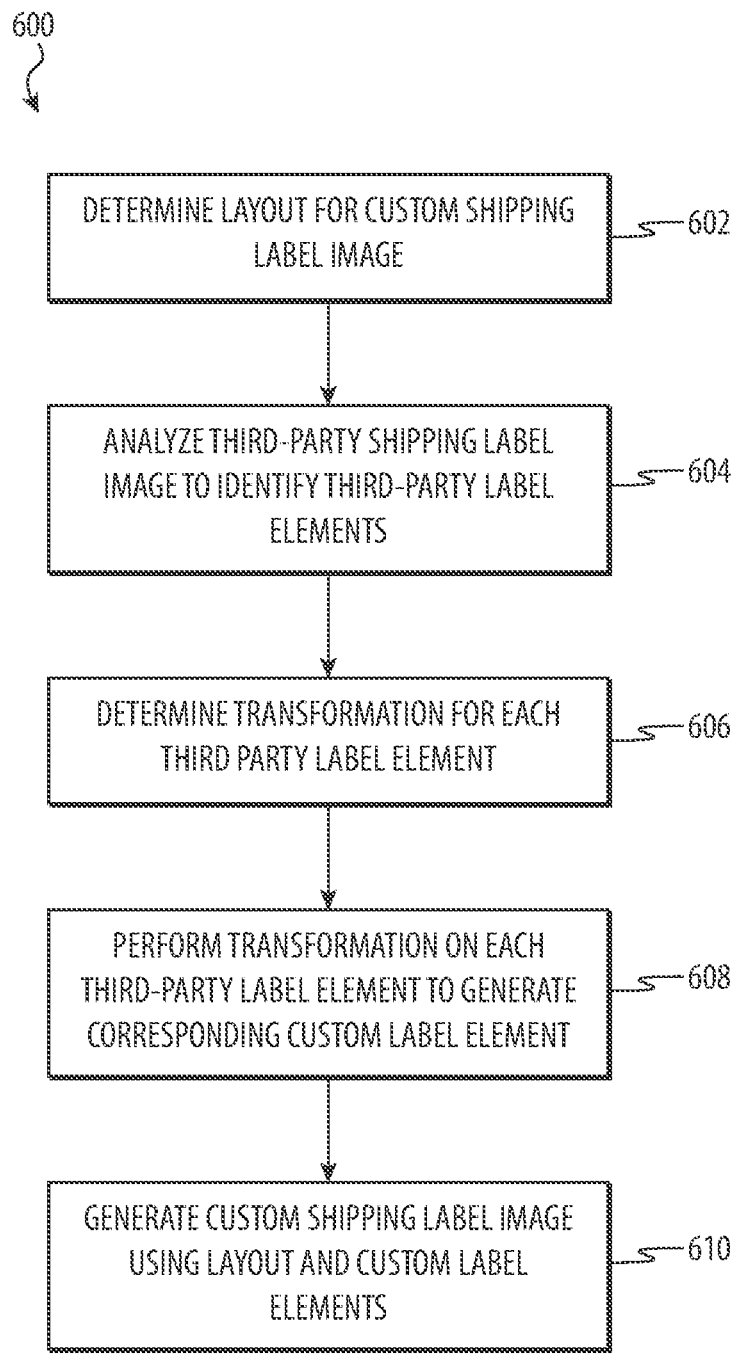
FIG. 6 is a flowchart depicting example operations of a method for formulating a custom shipping label image for use in shipping an item using an electronic shipping label device.

In some cases, the host device may perform at least some of the steps for formulating the custom shipping label image as described with respect to FIG. 6. The system server may transmit a third-party shipping label image, third-party label elements, custom label elements, and/or other shipment information to the host device. The host device and/or the system server may formulate the custom shipping label image based on information regarding the electronic shipping label device, including a storage capacity of a memory, display resolution, display size, display aspect ratio. The information about the electronic shipping label device may be received from the electronic shipping label device and/or stored at the host device and/or the system server.

At operation 410, the system server transmits the custom shipping label image to the host device. In some cases, the host device is configured to transmit the shipping label image to the electronic shipping label device for display at a display (e.g., an electronic paper display) of the electronic shipping label device. The custom shipping label image may be specifically formatted for proper display on the display of the electronic shipping label device.

Figure 5A:
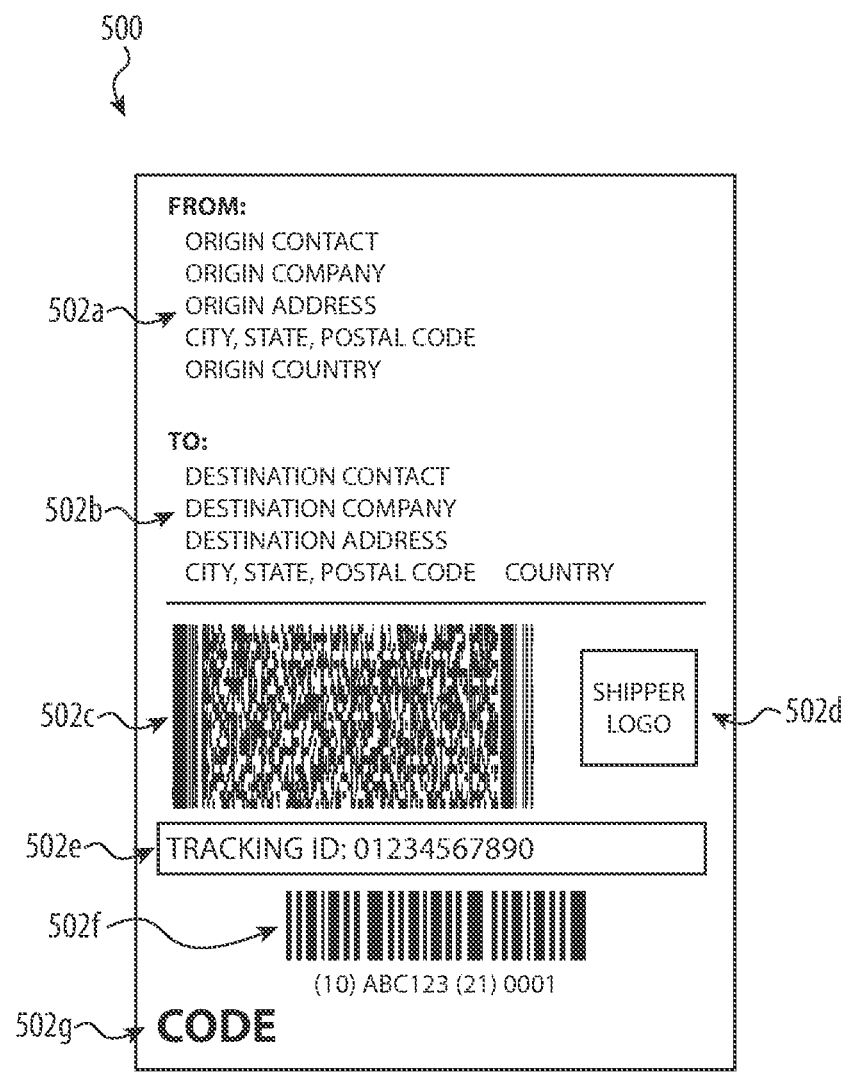
FIG. 5A depicts an example third-party shipping label image.

As noted above, in some cases, a custom shipping label image may be formulated using a third-party shipping label image. FIG. 5A depicts an example third-party shipping label image 500. The third-party shipping label image 500 may provide shipment information for use by shipping carriers and other parties to facilitate shipment of the item. As shown in FIG. 5A, the third-party shipping label image 500 may include third-party label elements (e.g., third-party label elements 502a-g) that include graphical content and/or text relating to the shipping parameters corresponding to the shipment. In the example third-party shipping label image 500, the third-party label elements include an origin address element 502a, a destination address element 502b, a barcode element 502c, a shipper logo element 502d, a tracking number element 502e, a barcode element 502f, and a shipment code element 502g. The third-party label elements 502a-g may be used by a shipping carrier to identify the item for shipment using a system of the shipping carrier. The third-party shipping label image 500 is an example third-party shipping label image, and is not intended to be limiting. In various embodiments, third-party shipping label images may include different third-party label elements positioned or arranged in different ways. Additional or alternative third-party label elements may include elements representing any information about the shipment or parties involved with the shipment, including but not limited to a delivery date, an item weight, a shipment price, insurance information, and the like. In various cases, the third-party shipping label image 500 may be a graphical representation of any shipment information that may be used by a shipping carrier to transport an item in combination with any other information.

The system server may analyze the third-party shipping label image 500 to identify third-party label elements and/or label formatting of the third-party shipping label image. Identifying third-party label elements may include identifying element characteristics of the third-party label elements, which describe traits of the label elements. Element characteristics may include element types, dimensions, formatting, resolution, color information, and the like. An element type of a label element may specify a type of information that included in a label element, such as numeric text, alphanumeric text, a barcode, an image, a logo, and the like.

The third-party shipping label image 500 may be formatted for printing the third-party shipping label image and affixing the printed label to an item as is common in traditional shipping methods. Label formatting may include a label image's dimension(s), aspect ratio, resolution, arrangement or relative positioning of label elements, color information, and the like. Label formatting may be selected by the third party that provides the third-party shipping label image to be suitable for printing. For example, the label formatting of a third-party shipping label may be optimized for printing using a laser printer.

The system server may analyze a third-party shipping label image to determine label formatting to determine whether the third-party shipping label image is compatible with or otherwise suitable for an electronic shipping label device. The system server may use device information relating to the electronic shipping label device to determine if a third-party shipping label image is compatible with the electronic shipping label device. The device information may include display characteristics of the electronic shipping label device, including display resolution, display size or dimensions, display aspect ratio, colors capable of being displayed by the display, and the like. The device information may further include other characteristics of the electronic shipping label device, including memory storage capacity, current memory utilization, data transfer capabilities, and the like. Device information may be received with from a shipping request or separately and/or maintained at the system server.

In some cases, the system server may determine that the third-party shipping label image is incompatible with the electronic shipping label device and that a custom shipping label image should be formulated. The label formatting of the third-party shipping label may be incompatible with or otherwise unsuitable for display on an electronic shipping label device, storage on the electronic shipping label device or another device, and/or transmission to or from the electronic shipping label device or another device. It may be difficult or impossible for the display of an electronic shipping label device to display a third-party shipping label image based on its resolution, size, or aspect ratio. A size or resolution of the third-party shipping label image may be greater than a size or resolution of the display. For example, a third-party shipping label image may have a resolution of around 600 dpi to 2400 dpi, while an electronic paper display of an electronic shipping label device may have a resolution of 300 dpi or less. Resizing or otherwise uniformly converting an entire third-party shipping label image to a size, resolution, or aspect ratio of the display may result in data corruption or loss as a result of scaling problems, resolution problems, and other issues. Additionally, third-party shipping label images received from different shipping carriers may be formatted differently from one another, including having different sizes, aspect ratios, resolutions, arrangements of elements, and other characteristics. As a result, it may be difficult or impossible for the electronic shipping label devices to properly display some or all third-party shipping label images as they are received. As such, it may be desirable to formulate custom shipping label images that are compatible with electronic shipping label devices.

Figure 5B:
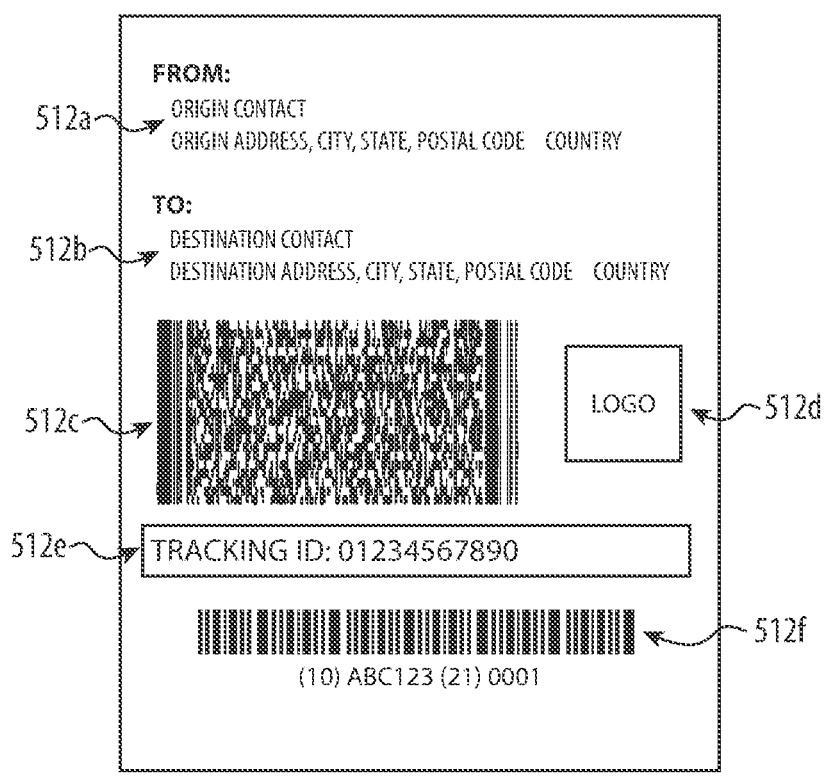
FIG. 5B depicts an example custom shipping label image.

FIG. 5B depicts an example custom shipping label image 510 that displays some or all of the shipment information contained in the third-party shipping label image 500 in a format that is compatible with an electronic shipping label device. As shown in FIG. 5B, the custom shipping label image 510 may have a custom layout that differs from the layout of the third-party shipping label image 510. The custom shipping label image 510 may have different label formatting compared to the third-party shipping label image 500. The custom shipping label image 510 may have a different label size, aspect ratio, and/or resolution compared to the third-party shipping label.

The custom shipping label image 510 may include a set of custom label elements 512a-f that have different element characteristics and/or are arranged differently compared to the third-party label elements of the third-party shipping label image 500. One or more of the custom label elements 512*a-f* may correspond to a respective third-party label element 502*a-f* of the third-party shipping label image. As described in more detail below with respect to FIG. 6, generating the custom shipping label image may include performing a transformation of one or more of the third-party label elements 502*a-g* to generate each third-party label element's corresponding custom label element. In the example custom shipping label image 510, the custom label elements include an origin address element 512*a* that corresponds to the origin address element 502*a*, a destination address element 512*b* that corresponds to the destination address element 502*b*, a barcode element 512*c* that corresponds to the barcode element 502*c*, a tracking number element 512*e* that corresponds to the tracking number element 502*e*, a barcode element 512*f* that corresponds to the barcode element 502*f*.

As described in more detail below with respect to FIG. 6, a transformation of a third-party label element may include any suitable operations for generating the custom label element based on the third-party label element. Example transformations may include scaling operations, cropping operations, data extraction operations, and regeneration operations. The transformation may be determined by analyzing third-party element characteristics of the third-party label element and desired custom element characteristics of the custom label element.

Additionally or alternatively, one or more custom label elements 512*a-f* may be generated without performing a transformation on a corresponding third-party label element. In some cases, a custom label element may be generated using shipment information, information stored at the system server, information retrieved from other sources, and the like. For example, the custom label elements may include a logo element 512*d* that is generated from data stored at the system server. Other custom label elements may include information not contained in the third-party shipping label image, including shipment information, user information, and the like.

The custom label elements 522*a-f* may be used by a shipping carrier to identify the item for shipment using a system of the shipping carrier. The custom shipping label image 510 is an example custom shipping label image, and is not intended to be limiting. In various embodiments, custom shipping label images may include different custom label elements positioned or arranged in different ways. Additional or alternative custom label elements may include elements representing any information about the shipment or parties involved with the shipment, including but not limited to a delivery date, an item weight, a shipment price, insurance information, and the like. In various cases, the custom shipping label image 510 may be a graphical representation of any shipment information that may be used by a shipping carrier to transport an item in combination with any other information.

FIG. 6 is a flowchart depicting example operations of a method 600 for formulating a custom shipping label image for use in shipping an item using an electronic shipping label device. The custom shipping label image may be specifically formatted for proper display on a display of the electronic shipping label device. The method 600 may be performed as part of other methods for configuring an electronic shipping label device, such as those described with respect to FIGS. 2-4. For example, the method 600 may be performed as part of operation 408 of the method 400.

At operation 602, the system server may determine a layout for the custom shipping label image. The custom shipping label image may include a set of custom label elements to be included in the custom shipping label image. The layout may specify target element characteristics for each custom label element of the set of custom label elements. Target element characteristics for a custom label element may include an element type, target dimensions for the custom label element, the custom label element's position on the shipping label image or relative to other elements, custom label element formatting, resolution, color information, and the like. The target dimensions for the custom label element may be dimensions of a region of the custom shipping label image where the custom label element will be positioned. An element type of a label element may specify a type of information that included in a label element, such as numeric text, alphanumeric text, a barcode, an image, a logo, and the like. The layout for the custom shipping label image may specify label formatting for the custom shipping label image. As noted herein, label formatting may include a label image's size, aspect ratio, resolution, arrangement or relative positioning of label elements, color information, and the like.

The layout may be implemented as a template file generated using domain-specific language. The system server may use device information relating to the electronic shipping label device to determine one or more layouts for an electronic shipping label device. The device information may include display characteristics of the electronic shipping label device, including display resolution, display size, display aspect ratio, colors capable of being displayed by the display, and the like. The device information may further include other characteristics of the electronic shipping label device, including memory storage capacity, current memory utilization, data transfer capabilities, and the like. Device information may be received with from a shipping request or separately and/or maintained at the system server.

The system server may generate and/or maintain multiple layouts. Different layouts may correspond to different electronic shipping label devices, different third-parties, and the like. In some cases, the layout is generated or received separately from the initiation of a particular shipment request, and determining the layout includes retrieving the layout from a storage location at the system server or elsewhere.

The system server may generate custom label elements for the custom shipping label image according to the determined layout. In some cases, generating the custom label elements includes analyzing a third-party shipping label image as described below with respect to operations 604-608. Additionally or alternatively, generating the custom label elements may include analyzing shipment information or other information, and may not rely on analyzing a third-party shipping label image. For example, the system server may receive or retrieve shipment information, user information, or the like corresponding to one or more custom label elements and generate the custom label elements using the shipment information or user information. The custom label elements may be used to generate a custom shipping label image as described below with respect to operation 610.

At operation 604, the system server may analyze a third-party shipping label image to identify a set of third-party label elements and determine third-party element characteristics for the third-party label elements. The identified third-party label elements may correspond to one or more custom label elements for the custom shipping label image. Determining third-party element characteristics for a particular third-party label element may include determining an element type and/or dimensions of the third-party label element for use in determining a transformation at operation 606 below.

Identifying the set of third-party label elements may include segmenting the third-party shipping label image into the third-party label elements. In some cases, the system server may store a template for multiple different type of third-party shipping label images that specifies the arrangement of third-party label elements in each third-party shipping label image. Identifying the set of third-party label elements may include determining which template applies to the received third-party shipping label image. Additionally or alternatively, identifying the set of third-party label elements may include performing object, image, and/or text recognition operations on the third-party shipping label image.

Additionally or alternatively, the system server may analyze the third-party shipping label image to determine label characteristics of the third-party shipping label image, including include the label image's dimension(s), aspect ratio, resolution, arrangement or relative positioning of label elements, color information, and the like.

At operation 606, the system server may determine a transformation for each third-party label element of the set of third-party label elements to generate a corresponding custom label element of the set of custom label elements of the custom shipping image label. A transformation of a third-party label element may include a suitable operation for generating the custom label element based on the third-party label element. The transformation may be determined based on the third-party element characteristics of the third-party label element and the desired custom element characteristics of the custom label element. For example, the transformation may be based on changes that are necessary to adjust the dimensions, formatting, resolution, and/or color information from those of the third-party label element to those of the custom label element. Example transformations may include scaling operations, cropping operations, data extraction operations, generating operations, compositing operations, color adjustment operations, and the like. As noted herein, scaling or otherwise uniformly converting an entire third-party label image for display on an electronic shipping label device may not be feasible, so different third-party label elements of a third-party shipping label image may undergo different transformations.

Scaling operations may include changing dimension(s), a resolution, and/or an aspect ratio of a label element or a portion thereof. A third-party label element, or a portion thereof, may be scaled to conform to desired dimensions, a desired resolution, and/or a desired aspect ratio specified by a custom layout. Cropping operations may include removing or separating portion(s) of a third-party label element.

Data extraction operations may include object, image, or text recognition operations or other operations to extract information from a third-party label element. Generating operations may include using data extracted from the third-party label element to create the custom label element. For example, a code (e.g., a numeric or alphanumeric code) extracted from a barcode may be used to regenerate a new barcode with desired element characteristics. As another example, text may be extracted from a third-party label element, for example by performing text recognition on the text, and the extracted text may be used to generate a new textual custom label element with desired element characteristics, such as formatting and dimensions. Compositing operations may include combining third-party label elements (or portions thereof) and/or other information, such as shipment information. Color adjustment operations may include changing a color depth or other color information.

In some cases, the transformation may be determined based on an element type the third-party label element and/or the custom label element. Some transformation operations may be suitable for certain element types, and not suitable for others. For example, some text and/or barcodes may not be able to be scaled or cropped. As another example, some barcodes may be unable to be regenerated using data extraction methods, and so they must be scaled. The system server may be capable of determining which transformation operations are suitable for a particular element type.

Determining a transformation for a third-party label element may include determining whether the third-party label element can be scaled or cropped to achieve the desired custom element characteristics. In some cases, scaling and cropping operations may be unsuitable for transforming a particular label element. Scaling and cropping may cause aspect ratio or resolution problems that result in data loss impacting the ability of the custom label element to be read by a human or a scanner. As one example, graphical objects that are scaled to a lower resolution may undergo aliasing. This may make text unreadable or cause a barcode to be unreadable or incorrect. The system server may determine whether scaling or cropping to achieve desired custom element characteristics will result in text being unreadable or a barcode being unreadable or incorrect. In the case of a barcode, the system server may determine a type of the barcode and determine if a required amount of scaling or cropping can be achieved without data loss. For example, a particular type of barcode may be incapable of having a resolution below a certain value and/or may be incapable of having its aspect ratio changed more than a certain amount without data loss.

In accordance with determining that a third-party label element can be scaled or cropped to achieve desired custom element characteristics, the transformation may include scaling or cropping the third-party label element to generate the custom label element, and may not include other transformation operations. In accordance with determining that the third-party label element cannot be scaled or cropped to achieve desired custom element characteristics, the transformation may include extracting data from the third-party label element and generating the custom label element using the extracted data.

Determining a transformation for a third-party label element may include determining whether a custom label element can be generated using data extracted from the third-party label element. In accordance with determining that a custom label element can be generated using data extracted from the third-party label element, the transformation may include extracting data from the third-party label element and generating the custom label element using the extracted data. In accordance with determining that the data of a third-party label element cannot be extracted and/or that the custom label element cannot be generated in a manner sufficient to be read by human or scanning machine using data extracted from the third-party label element, the transformation may include scaling or cropping the third-party label element to generate the custom label element, and may not include other transformation operations.

At operation 608, the system server may perform the transformations determined in operation 606. The system server may perform each determined transformation on each third-party label element to generate its corresponding custom label element. For a given third-party shipping label image, different transformations may be performed on different third-party label elements.

At operation 610, the system server may generate the custom shipping label image using the determined layout and the generated custom label elements. Generating the custom shipping label image may include assembling the generated custom label elements according to the determined layout.

The example operations of the method 600 are noted as being performed by the system server. However, in various embodiments, one or more steps of the method 600 may be performed by the system server (e.g., system server 110), a host device (e.g., host device 108), an electronic shipping label device (e.g., electronic shipping label device 106), and/or another suitable electronic device. In some cases, the system server may receive shipment information in addition to or in lieu of a third-party shipping label image. The shipment information may be used to formulate the custom shipping label image.

In some embodiments, one or more operations of the methods 200, 300, 400, and 600 are omitted or performed in a different order. In some embodiments, additional or alternative operations that are not shown are performed as part of the methods 200, 300, 400, and 600.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Figure 7:
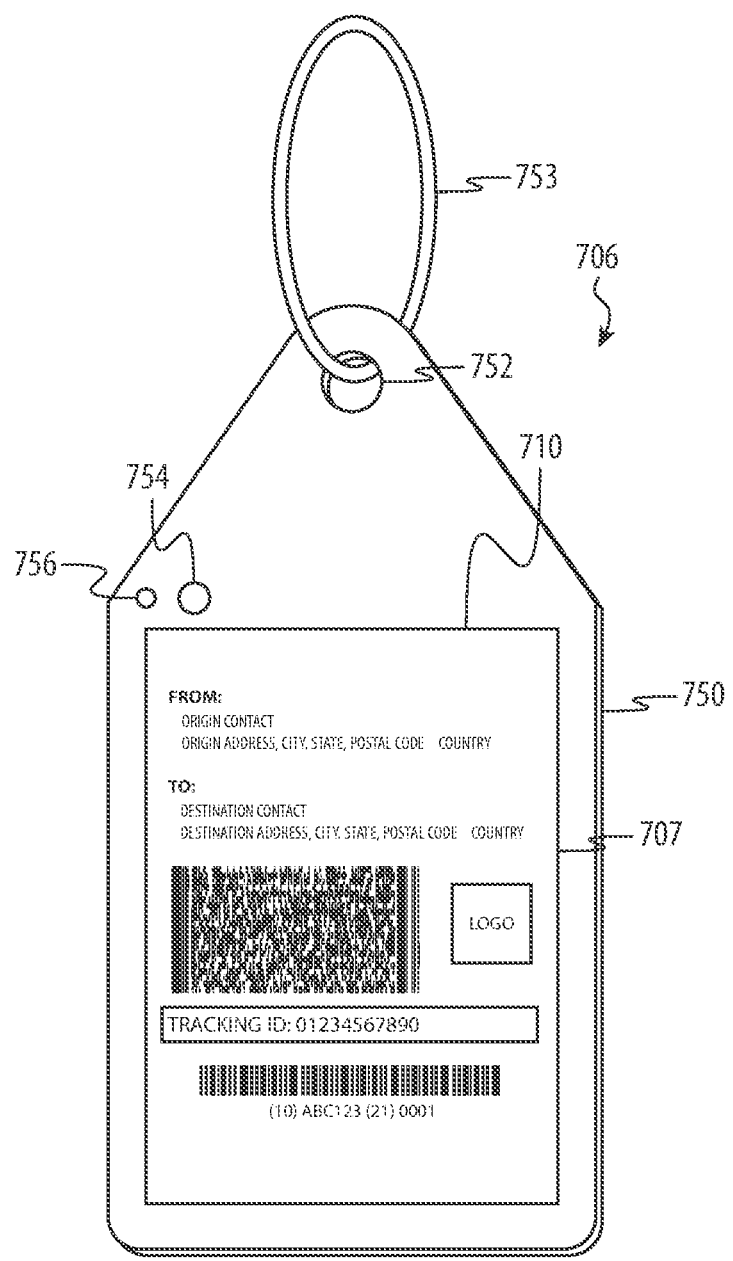
FIG. 7 depicts an example electronic shipping label device that may be used to provide information to shipping carrier agents and other individuals during shipment of an item, such as a golf bag.

FIG. 7 depicts an example electronic shipping label device 706 that may be used to provide information to shipping carrier agents and other individuals during shipment of an item, such as a golf bag. The electronic shipping label device 706 may include a device enclosure 750. A display 707 (e.g., an electronic paper display) may be positioned at least partially within the device enclosure 750. As noted above, the display 707 may be adapted to display a custom shipping label image 710 corresponding to a shipment of an item. The custom shipping label image 710 may be similar to the custom shipping label image 610 discussed above with respect to FIG. 5B.

As noted above, the electronic shipping label device 706 may receive the custom shipping label image 710 from a system server, and/or a host device. The electronic shipping label device 706 may display a shipping label image from a third-party system, such as the third-party shipping label image 600 discussed above with respect to FIG. 5A.

As noted above, in some cases, the display 707 is an electronic paper (e.g., electronic ink or e-ink) display. In some cases, as noted above, the graphical output provided by the display is persistent in that once the graphical output of the display 707 is set (e.g., once a custom shipping label image is displayed on the display 707), the graphical output may be maintained on the display indefinitely without electricity and/or without consuming power from and internal power source (e.g., a battery) or an external power source. In some cases, the graphical output of the display 707 may be cleared from the display and a new graphical output may be provided, for example to display a new shipping label image corresponding to a different shipment of an item. In some cases, one or more portions of the graphical output of the display 707 may be updated or altered without clearing the graphical output from the display. In some cases, the display 707 mimics the appearance of ordinary ink on paper. The electronic paper display may be implemented using any suitable technology, including electrophoretic display technology, electrowetting display (EWD) technology, electrofluidic display technology, and the like.

In some cases, some or all of the components of the electronic shipping label device 706 may be positioned within or partially within the enclosure 750. The enclosure 750 may be formed of any suitable material or combination of materials, including plastic, glass, metal, and the like. In some cases, the enclosure 750 is strengthened to prevent damage during shipping and other activities. For example, in some cases, the device enclosure 750 may include glass-filled plastic.

In some cases, the electronic shipping label device 706 includes an attachment mechanism 753, which may be used to attach the electronic shipping label device to an item (e.g., luggage, a parcel, etc.) included in a shipment. For example, the electronic shipping label device 706 may be attached to a golf bag for shipment of the golf bag from a first location to a second location (e.g., from a first golf course to a second golf course). The attachment mechanism 753 may be releasably attachable to an item, such that the attachment mechanism may be attached and subsequently removed from the item without damaging the attachment mechanism. In some cases, the attachment mechanism 753 may be used multiple times to attach the electronic shipping label device 7 to multiple different items (or to the same item multiple times).

In some cases, the attachment mechanism 753 is coupled to the enclosure 750 via an opening 752 (e.g., a through-hole) in the enclosure. The attachment mechanism 753 may pass through the opening 752 and may be tied or otherwise secured to the item for shipment. In some cases, the attachment mechanism 753 is an elastic member, such as an elastic band that passes through the opening 752. In other cases, the attachment mechanism 753 may be a strap or other device that passes through the opening 752 and is adapted to be secured to one or more items. In still other embodiments, the attachment mechanism 753 may include one or more clips, snaps, buttons, or other devices suitable for securing the electronic shipping label device 706 to an item. In some embodiments, the electronic shipping label device 706 may be permanently attached or integrated with a shippable object or container, such as a parcel or shipping container.

In some cases, the electronic shipping label device 706 includes a status indicator light 756. The status indicator light 756 may indicate a status of the electronic shipping label device 706, such as whether the device is powered on, a battery status (e.g., low battery), an error notification, or the like. The status indicator light 756 may include one or more light-emitting diodes (LEDs) and may be capable of displaying multiple colors indicating different information. For example, a green light may indicate the device is powered on, a yellow light may indicate low battery, and a red light may indicate an error at the device. Alternatively or additionally, the status indicator light 756 may be configured to flash, blink, or the like to provide additional information.

In some cases, the electronic shipping label device 706 includes one or more control buttons (e.g., a control button 754). The control button 754 may be used to power the device on and off, to power the display of the device on and off, to perform a wireless pairing process with another device (e.g., a host device), to check a status of the device, or the like.

FIG. 8 depicts an example interface 818 of a host device 808 that may be used to access a shipping management system. The interface 818 may be used to configure an electronic shipping label device for shipment of an item and/or to provide shipping parameters associated with shipment of an item. In the example of FIG. 8, the host device 808 is a portable electronic device, such as a tablet or smartphone. This is provided as merely an illustrative example. In other embodiments, the host device 808 may include, without limitation, a desktop computing system, a notebook computing system, a terminal, an electronic kiosk, or other computing device configured to operate an interface 818. As shown in FIG. 8, the interface 818 (e.g., a graphical user interface) may include prompts and/or user interface elements that allow users to provide information regarding a shipment (e.g., shipping parameters).

The interface 818 may include an origin address element 802 that allows a user to provide an origin or return address for a shipment and a destination address element 804 that allows a user to provide a destination address for a shipment. In some cases, an origin or return address and/or a destination address may be stored by the shipping management system and automatically populated or provided as part of the interface 818. In some cases, multiple origin or return addresses and/or a destination addresses may be stored by the shipping management system and a user may be able to select from a list of addresses to provide the origin address or destination address. In some cases, the origin or return address may be determined automatically, for example using a location determination device (e.g., a global positioning system (GPS) device) of the host device 808 that indicates a current position of the device.

The interface 818 may include a customer information element 806 that allows a user to provide customer information, such as the customer's name, contact information (e.g., phone number, e-mail address, etc.), and the like. The interface 818 may include a date element 828 that allows a user to provide a shipment initiation date and/or a target delivery date.

The interface 818 may include one or more item information elements 810, 812 that allow a user to provide information regarding one or more items to be shipped. In some cases, a user may be able to use information elements 810 to specify a number of golf bags to be shipped, along with the size (e.g., dimensions, weight, etc.), packaging (e.g., box, hard-shell carrier, etc.), and insurance preferences (e.g., whether the user wants to purchase shipping insurance). In some cases, the user may be able to user information elements 812 to provide similar information for other types of luggage.

As noted above, shipping parameters received using the interface 818 may be transmitted to a system server and/or a third-party system to initiate a shipment. In some cases, in response to the shipping parameters being provided to the system server and/or the third-party system, the host device receives a shipping label image for display by an electronic shipping label device. The electronic shipping label device may be operably coupled to the host device 808, and the host device 808 may transmit the shipping label image to the electronic shipping label device so that the electronic shipping label device may display the shipping label image. In some cases, shipment information, including the shipping label image, may be displayed in the interface 818. In some cases, the user may instruct the host device to transmit the shipping label image to the electronic shipping label device. In some cases, the host device may automatically transmit the shipping label image to the electronic shipping device.

Figure 9:
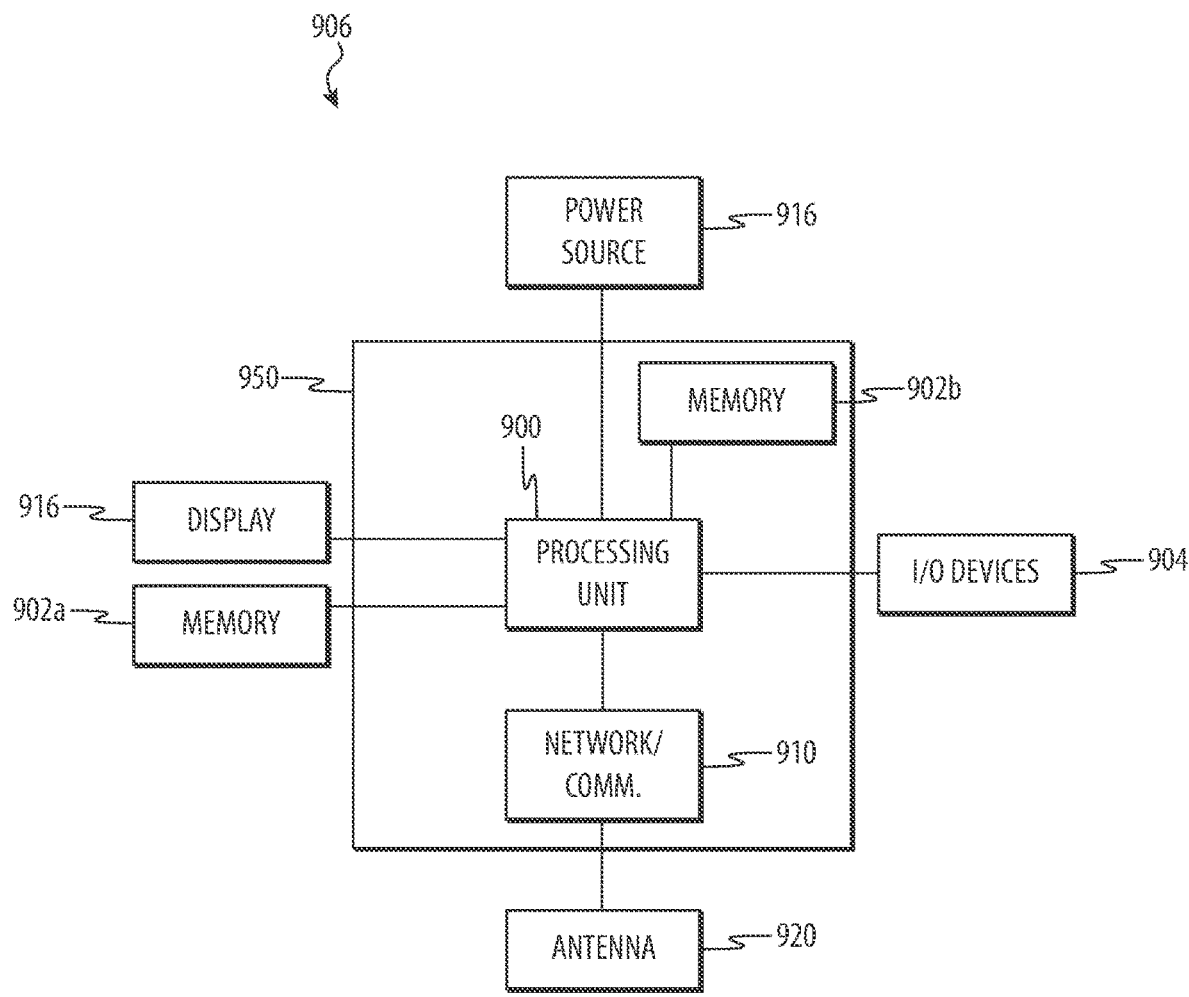
FIG. 9 depicts an illustrative block diagram of an electronic shipping label device as described herein.

FIG. 9 is an illustrative block diagram of an electronic shipping label device 906 as described herein (e.g., electronic shipping label devices 106, 706). The electronic shipping label device 906 can include a processing unit 900, memory 902a, memory 902b, one or more input/output (I/O) devices 904, a power source 918, a network communications interface 910, and an antenna 920.

In some cases, one or more components of the electronic shipping label device 906 may be modules or components of an integrated circuit 950 (e.g., a chip). For example, the integrated circuit 950 may include the processing unit 900, the network communications interface 910, and the memory 902b on a single substrate.

In some cases, the I/O devices 904 include one or more status indicator lights (e.g., LED lights) for providing status information regarding the electronic shipping label device 906. For example, the I/O devices 904 may include a blue LED and a red LED for providing status updates to users. In some cases, the I/O devices 904 include one or more control buttons for providing input(s) to the electronic shipping label device 906. The control buttons may be used to power the device on and off, to power the display of the device on and off, to perform a wireless pairing process with another device (e.g., a host device), to check a status of the device, or the like. Status indicator lights and buttons are discussed in more detail above with respect to FIG. 5.

In some cases, the I/O devices 904 may include one or more ports or connectors configured to interface with another device (e.g., via a cable). In some cases, the I/O devices 904 include a debug/test connector for performing testing, initial configuration, provisioning, and other functions at the electronic shipping label device 906.

In some cases, the I/O devices 904 may be operably coupled to the processing unit 900 via one or more connectors. In some cases, the connectors include one or more general purpose input output (GPIO) digital signal pins of the integrated circuit 950. I/O devices are discussed in more detail below with respect to FIG. 10.

As shown in FIG. 9, the electronic shipping label device 906 may include a memory 902a that is not part of the integrated circuit 950 and a memory 902b that is part of the integrated circuit 950. In some cases, the memory 902a is configured to store shipping label images. In some cases, the memory 902a includes persistent memory only, such as Flash memory. In other cases, the memory 902a includes persistent and/or non-persistent memory. In some cases, the memory 902b is used to store other data involved in operating the electronic shipping label device 902. In some cases, the memory 902b includes persistent and non-persistent memory. The memory 902a and the memory 902b can be configured as any type of memory. In various cases, the memory 902a and the memory 902b can be implemented as random access memory, read-only memory, Flash memory, removable memory, or other types of storage elements, or combinations of such devices.

As noted above, the display 916 may be implemented as an electronic paper display configured to provide a graphical output (e.g., a shipping label image). In some cases, as noted above, the graphical output of the display is persistent in that once it is provided (e.g., once a shipping label image is displayed on the display), the graphical output may be maintained on the display indefinitely and/or without consuming power from and internal power source (e.g., a battery) or an external power source. In some cases, the memory 902a, the processing unit 900, and/or the display 916 may be operably coupled to one another via a serial communication interface (e.g., a serial peripheral interface (SPI)) of the integrated circuit 950 or another suitable connection mechanism.

The power source 918 can be implemented with any device capable of providing energy to the electronic device.

For example, the power source 918 can be one or more batteries (including rechargeable batteries, such as lithium-ion polymer batteries), or a connector (e.g., a USB micro connector) and/or cable that connects the electronic device to another power source such as a wall outlet for powering the device and/or charging the batteries. In some cases, the power source 918 may include an integrated circuit configured to manage battery charging operations. In some cases, the power source 918 may include a voltage regulator (e.g., a 3.3V regulator) for maintaining a constant voltage level. In some cases, the power source 918 is operably coupled to the processing unit 900 for monitoring battery status, charging status, and the like. In some cases, the integrated circuit 950 includes an analog-to-digital converter (ADC) that operably couples the power source 918 to the processing unit 900.

In some cases, the network communications interface 910 is a wireless network communication interface operably coupled to the processing unit 900 and configured to wirelessly communicate with other devices (e.g., a host device). In some case, the electronic shipping label device 906 is connected to a host device via a network, such as WI-FI, BLUETOOTH LE, a cellular network (e.g., GSM, LTE, or other cellular network), or the like. In some cases, the network communications interface 910 is operably coupled to an antenna 920 for facilitating wireless signal transmission and receipt. In some cases, the antenna is implemented as a surface-mount device (SMD) antenna. The antenna 920 may facilitate communication across one or more frequencies. In some cases, the antenna 920 operates at 2.4 GHz.

The processing unit 900, the memory 902a and 902b, the I/O devices 904, the power source 918, and the network communications interface 910 may be implemented as described below with respect to the like-named components described below with respect to FIG. 10.

Figure 10:
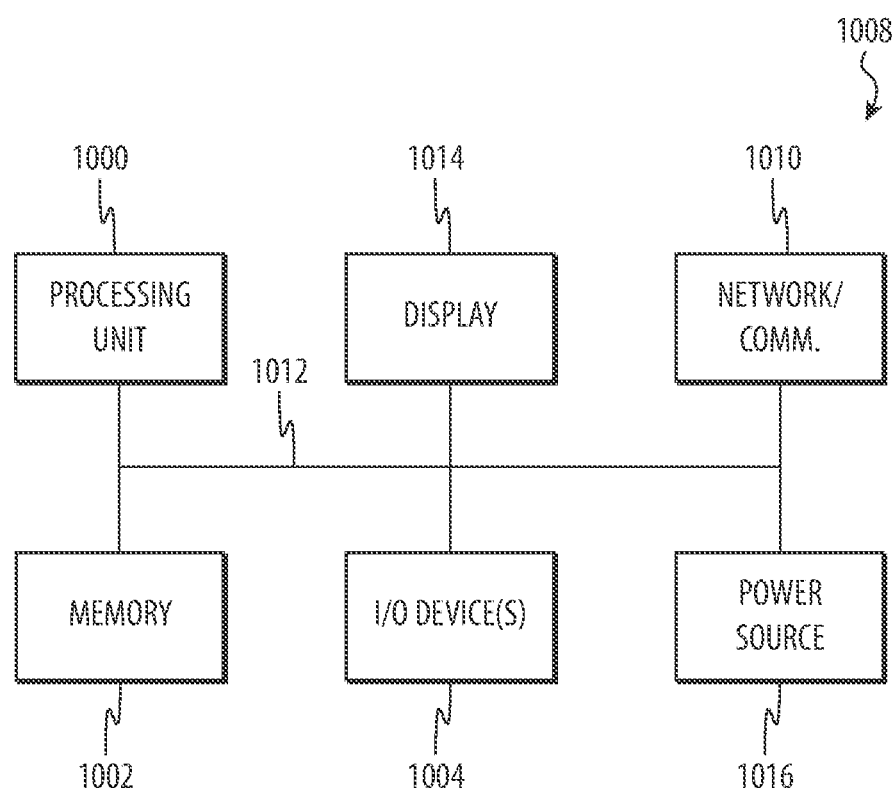
FIG. 10 is an illustrative block diagram of an electronic device as described herein.

FIG. 10 is an illustrative block diagram of an electronic device 1008 as described herein (e.g., host devices 108, 1008, system server 110, electronic shipping label devices 106, 706, 906 etc.) The electronic device can include a display 1016, one or more processing units 1000, memory 1002, one or more I/O devices 1004, a power source 1018, and a network communications interface 1010.

The display 1016 may provide an image or graphical output (e.g., computer-generated image data) for the electronic device. The display may also provide an input surface for one or more input devices, such as, for example, a touch sensing device and/or a fingerprint sensor. The display 1016 may be substantially any size and may be positioned substantially anywhere on the electronic device. The display 1016 can be implemented with any suitable technology, including, but not limited to liquid crystal display (LCD) technology, light emitting diode (LED) technology, organic light-emitting display (OLED) technology, organic electroluminescence (OEL) technology, electronic paper (e.g., electronic ink) display technology, or another type of display technology. The display 1016 provides a graphical output, for example associated with an operating system, user interface, and/or applications of the electronic device 1008. In some embodiments, the display 1016 is configured as a touch-sensitive (e.g., single-touch, multi-touch) and/or force-sensitive display to receive inputs from a user. In some embodiments, the touch-sensitive display includes one or more sensors (e.g., capacitive touch sensors, ultrasonic sensors, or other touch sensors) positioned above, below, or integrated with the display. In various embodiments, a graphical output of the display 1016 is responsive to inputs provided to the electronic device 1008.

The processing unit 1000 can control some or all of the operations of the electronic device. The processing unit 1000 can communicate, either directly or indirectly, with substantially all of the components of the electronic device. For example, a system bus or signal line 1012 or other communication mechanisms (e.g., electronic connectors) can provide communication between the processing unit(s) 1000, the memory 1002, the I/O device(s) 1004, the power source 1018, and/or the network communications interface 1010. The one or more processing units 1000 can be implemented as any electronic device capable of processing, receiving, or transmitting data or instructions. For example, the processing unit(s) 1000 can each be a microprocessor, a central processing unit, an application-specific integrated circuit, a field-programmable gate array, a digital signal processor, an analog circuit, a digital circuit, or combination of such devices. The processor may be a single-thread or multi-thread processor. The processor may be a single-core or multi-core processor.

Accordingly, as described herein, the phrase "processing unit" or, more generally, "processor" refers to a hardware-implemented data processing unit or circuit physically structured to execute specific transformations of data including data operations represented as code and/or instructions included in a program that can be stored within and accessed from a memory. The term is meant to encompass a single processor or processing unit, multiple processors, multiple processing units, analog or digital circuits, or other suitably configured computing element or combination of elements.

The memory 1002 can store electronic data that can be used by the electronic device. For example, a memory can store electrical data or content such as, for example, audio and video files, documents and applications, device settings and user preferences, timing signals, signals received from the one or more sensors, one or more pattern recognition algorithms, data structures or databases, and so on. The memory 1002 can be configured as any type of memory. By way of example only, the memory can be implemented as random access memory, read-only memory, Flash memory, removable memory, or other types of storage elements, or combinations of such devices.

The one or more I/O devices 1004 can transmit and/or receive data to and from a user or another electronic device. The I/O device(s) 1004 can include a display, a touch or force sensing input surface such as a trackpad, one or more buttons, one or more microphones or speakers, one or more ports such as a microphone port, one or more accelerometers for tap sensing, one or more optical sensors for proximity sensing, and/or a keyboard. In some cases, the I/O devices 1004 include a haptic vibrator for providing haptic outputs relating a status or other information related to the electronic device.

In some cases, the I/O devices 1004 include one or more status indicator lights (e.g., LED lights) and/or speakers for providing status information regarding the electronic device. In some cases, the I/O devices 1004 include one or more control buttons for providing input(s) to the electronic device. The control buttons may be used to power the device on and off, to power the display of the device on and off, to perform a wireless pairing process with another device (e.g., a host device), to check a status of the device, or the like. Status indicator lights and buttons are discussed in more detail above with respect to FIG. 7.

The power source 1018 can be implemented with any device capable of providing energy to the electronic device. For example, the power source 1018 can be one or more batteries or rechargeable batteries, or a connection cable that connects the electronic device to another power source such as a wall outlet.

The network communication interface 1010 can facilitate transmission of data to or from other electronic devices. For example, a network communication interface can transmit electronic signals via a wireless and/or wired network connection. Examples of wireless and wired network connections include, but are not limited to, cellular, Wi-Fi, Bluetooth, IR, and Ethernet.

It should be noted that FIG. 10 is for illustrative purposes only. In other examples, an electronic device may include fewer or more components than those shown in FIG. 10. Additionally or alternatively, the electronic device can be included in a system and one or more components shown in FIG. 10 are separate from the electronic device but included in the system. For example, an electronic device may be operatively connected to, or in communication with a separate display. As another example, one or more applications can be stored in a memory separate from the wearable electronic device. The processing unit in the electronic device can be operatively connected to and in communication with the separate display and/or memory.

As noted above, many embodiments described herein reference systems, methods, and devices for electronic shipping labels. It may be appreciated, however, that this is merely one example; other configurations, implementations, and constructions are contemplated in view of the various principles and methods of operations—and reasonable alternatives thereto—described in reference to the embodiments described above.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments. Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Although the disclosure above is described in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

What is claimed is:

1. A method for configuring an electronic shipping label device to be attached to an item to be shipped, the method comprising:
   receiving, at a system server, from a portable electronic device, an initiation request corresponding to a shipment of an item using the electronic shipping label device, the initiation request transmitted in response to the portable electronic device receiving a request to initiate the shipment at a graphical user interface operated on the portable electronic device;
   transmitting a shipping request to a third-party system, the shipping request including shipping parameters corresponding to the shipment;
   receiving shipment information from the third-party system in response to the shipping request, the shipment information comprising a third-party shipping label image;
   determining a layout for a custom shipping label image for display on the electronic shipping label device, the custom shipping label image comprising a set of custom label elements and the layout specifying target dimensions and a position on the custom shipping label image for each of the set of custom label elements;
   analyzing the third-party shipping label image to identify a set of third-party label elements;
   identifying a transformation for each of the set of third-party label elements;
   generating each of the set of custom label elements by performing a respective transformation on a corresponding third-party label element in accordance with a respective set of target dimensions of the layout;
   generating the custom shipping label image using the set of custom label elements and the layout; and
   transmitting the custom shipping label image to the portable electronic device, the portable electronic device configured to transmit the custom shipping label image to the electronic shipping label device for display at an electronic paper display of the electronic shipping label device.

2. The method of claim 1, wherein:
   analyzing the third-party shipping label image comprises determining an element type for each of the set of third-party label elements; and
   the method further comprises:
      determining a first transformation to perform on a first third-party label element to generate a first custom label element, the first transformation determined based on a first element type determined for the first third-party label element and first target dimensions for the first custom label element specified by the layout;
      determining a second transformation, different from the first transformation, to perform on a second third-party label element to generate a second custom label element, the second transformation determined based on a second element type determined for the second third-party label element and second target dimensions for the second custom label element specified by the layout;
      generating the first custom label element by performing the first transformation on the first third-party label element; and
      generating the second custom label element by performing the second transformation on the second third-party label element.

3. The method of claim 2, wherein:
the first transformation comprises scaling the first third-party label element to conform to the first target dimensions; and
the second transformation comprises:
extracting text from the second third-party label element; and
generating the second custom label element using the extracted text.

4. The method of claim 2, wherein:
the first third-party label element comprises a first barcode;
the first transformation comprises:
determining a code represented by the first barcode; and
generating a second barcode having the first target dimensions using the code.

5. The method of claim 2, wherein determining the first transformation comprises determining whether the first third-party label element can be scaled to the first target dimensions without data loss.

6. The method of claim 5, wherein:
in accordance with determining that the first third-party label element can be scaled to the first target dimensions without data loss, the first transformation comprises scaling the first third-party label element to the first target dimensions; and
in accordance with determining that the first third-party label element cannot be scaled to the first target dimensions without data loss, the first transformation comprises:
extracting data from the first third-party label element; and
generating the first custom label element using the extracted data.

7. The method of claim 2, wherein determining the first transformation comprises determining whether the first custom label element can be generated using data extracted from the first third-party label element.

8. The method of claim 7, wherein:
in accordance with determining that the first third-party label element can be generated using data extracted from the first third-party label element, the first transformation comprises:
extracting data from the first third-party label element; and
generating the first custom label element using the extracted data; and
in accordance with determining that the first third-party label element cannot be generated using data extracted from the first third-party label element, the first transformation comprises scaling the first third-party label element to the first target dimensions.

9. A method for configuring an electronic shipping label device, the method comprising:
receiving, at a graphical user interface operated on a host device, a request to initiate a shipment of an item using the electronic shipping label device and destination information corresponding to the shipment;
transmitting the destination information and an initiation request to a system server;
receiving a third-party shipping label image corresponding to the shipment;
analyzing the third-party shipping label image to identify a set of third-party label elements;
determining a first transformation to perform on a first third-party label element of the set of third-party label elements to generate a first custom label element for a custom shipping label image, the first transformation determined based on a first element type determined for the first third-party label element and first target dimensions for the first custom label element;
determining a second transformation, different from the first transformation, to perform on a second third-party label element of the set of third-party label elements to generate a second custom label element for the custom shipping label image, the second transformation determined based on a second element type determined for the second third-party label element and second target dimensions for the second custom label element;
generating the first custom label element by performing the first transformation on the first third-party label element;
generating the second custom label element by performing the second transformation on the second third-party label element;
generating the custom shipping label image using the first custom label element and the second custom label element; and
transmitting the custom shipping label image to the electronic shipping label device for display on a display of the electronic shipping label device.

10. The method of claim 9, further comprising determining a layout for the custom shipping label image, the layout specifying target dimensions and a position on the custom shipping label image for each of a set of custom label elements of the custom shipping label image.

11. The method of claim 9, wherein analyzing the third-party shipping label image further comprises determining the first element type and the second element type.

12. The method of claim 9, wherein the first transformation comprises at least one of:
scaling the first third-party label element to conform to the first target dimensions; or
extracting text from the second third-party label element and generating the second custom label element using the extracted text.

13. The method of claim 9, wherein the first transformation comprises:
determining a code represented by the first third-party label element; and
generating the second custom label element using the code.

14. The method of claim 9, wherein:
the third-party shipping label image is a first third-party shipping label image;
the custom shipping label image is a first custom shipping label image;
the method further comprises:
receiving, at the host device, updated destination information corresponding to the shipment;
transmitting the updated destination information to the system server;
receiving, from the system server, a second third-party shipping label image corresponding to the updated destination information;
generating a second custom shipping label image; and
transmitting the second custom shipping label image to the electronic shipping label device; and
transmission of the second custom shipping label image causes the electronic shipping label device to replace the first custom shipping label image with the second custom shipping label image.

15. The method of claim 9, wherein:

the method further comprises:

receiving, from the system server, one or more price quotes for the shipment;

receiving, at the graphical user interface of the host device, a selection of a price quote of the one or more price quotes for the shipment; and transmitting the selection to the system server, wherein:

the system server transmits the initiation request to a third-party system in response to receiving the selection.

16. A system comprising:

an electronic shipping label device comprising:

an enclosure defining an opening;

an attachment mechanism configured to attach the enclosure to an item to be shipped;

a battery positioned within the enclosure;

an electronic paper display positioned at least partially within the opening and configured to display a custom shipping label image corresponding to a shipment;

a processing unit positioned within the enclosure and configured to control a graphical output of the electronic paper display; and a wireless network communication interface operably coupled to the processing unit; and a host device operably coupled to the electronic shipping label device and comprising a graphical user interface configured to receive shipping parameters corresponding to the shipment;

a system server operably coupled to the host device and configured to:

receive, from the host device, the shipping parameters and an initiation request regarding the shipment;

transmit a shipping request and the shipping parameters to a third-party system;

receive a third-party shipping label image for the shipment from the third-party system;

analyze the third-party shipping label image to identify a set of third-party label elements;

perform a first transformation on a first third-party label element of the set of third-party label elements to generate a first custom label element of the custom shipping label image;

perform a second transformation on a second third-party label element of the set of third-party label elements to generate a second custom label element of the custom shipping label image;

generate the custom shipping label image using the first custom label element and the second custom label element; and transmit the custom shipping label image to the host device; wherein:

the host device is configured to transmit the custom shipping label image to the electronic shipping label device;

the electronic shipping label device is configured to:

receive the custom shipping label image; and display the custom shipping label image using the electronic paper display.

17. The system of claim 16, wherein the system server is further configured to:

determine a layout for the custom shipping label image, the custom shipping label image comprising a set of custom label elements and the layout specifying target dimensions and a position on the custom shipping label image for each of the set of custom label elements; and generate the custom shipping label image using the layout.

18. The system of claim 17, wherein the system server is further configured to:

determine the first transformation based on a first element type determined for the first third-party label element and first target dimensions for the first custom label element specified by the layout; and determine the second transformation based on a second element type determined for the second third-party label element and second target dimensions for the second custom label element specified by the layout.

19. The system of claim 18, wherein the system server is further configured to determine the first element type and the second element type.

20. The system of claim 16, wherein the first transformation comprises at least one of:

scaling the first third-party label element; or extracting text from the second third-party label element and generating the second custom label element using the extracted text.

\* \* \* \* \*